Inventor
OLIVER F. BAUER
ALBERT P. SCHAUSEIL
By B.F.Schlesinger Attorney

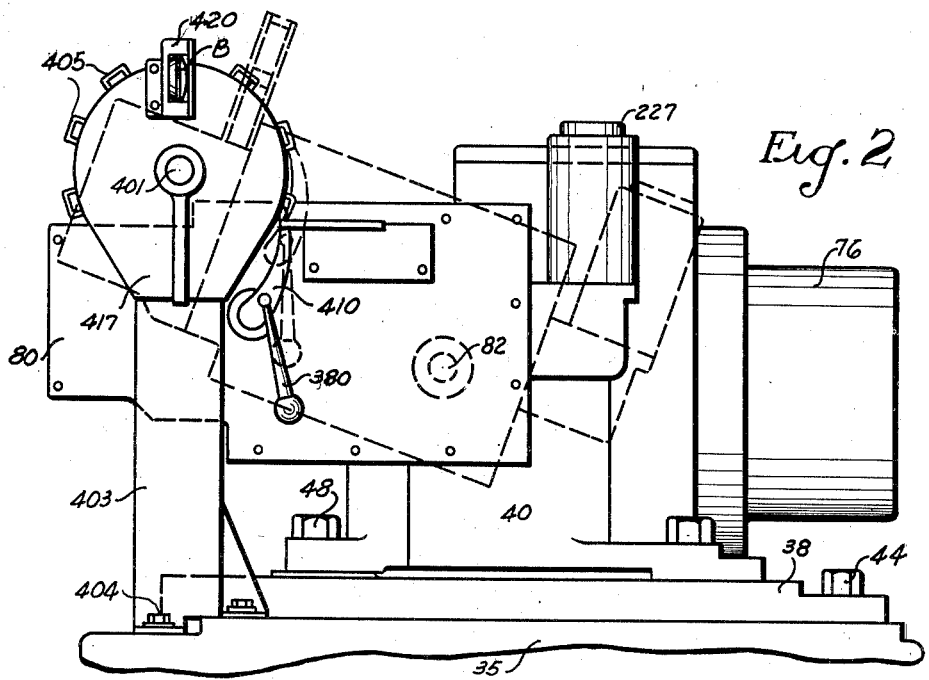
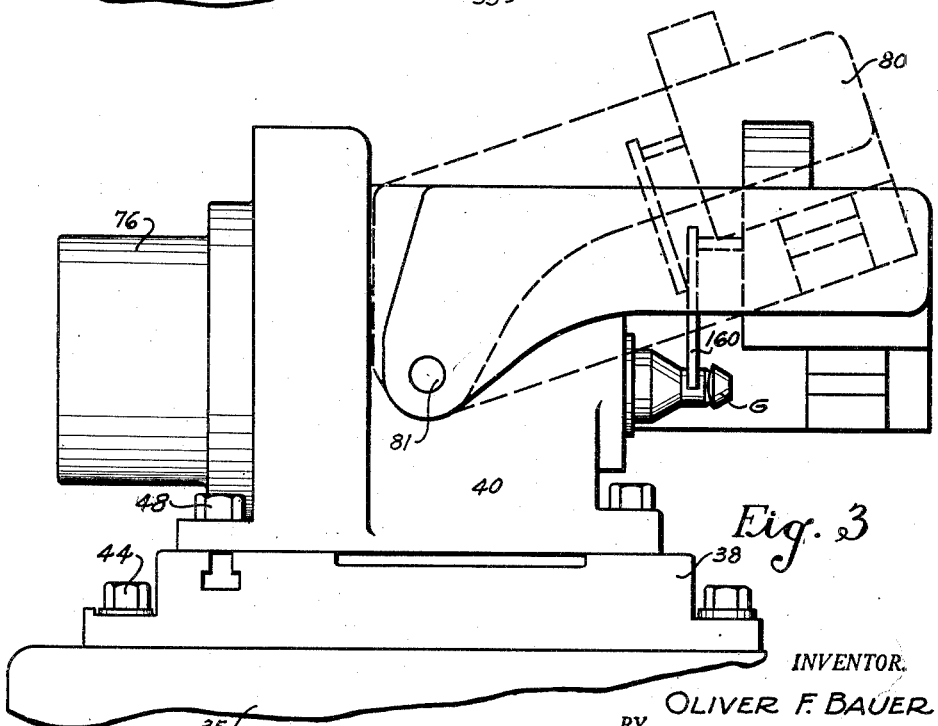

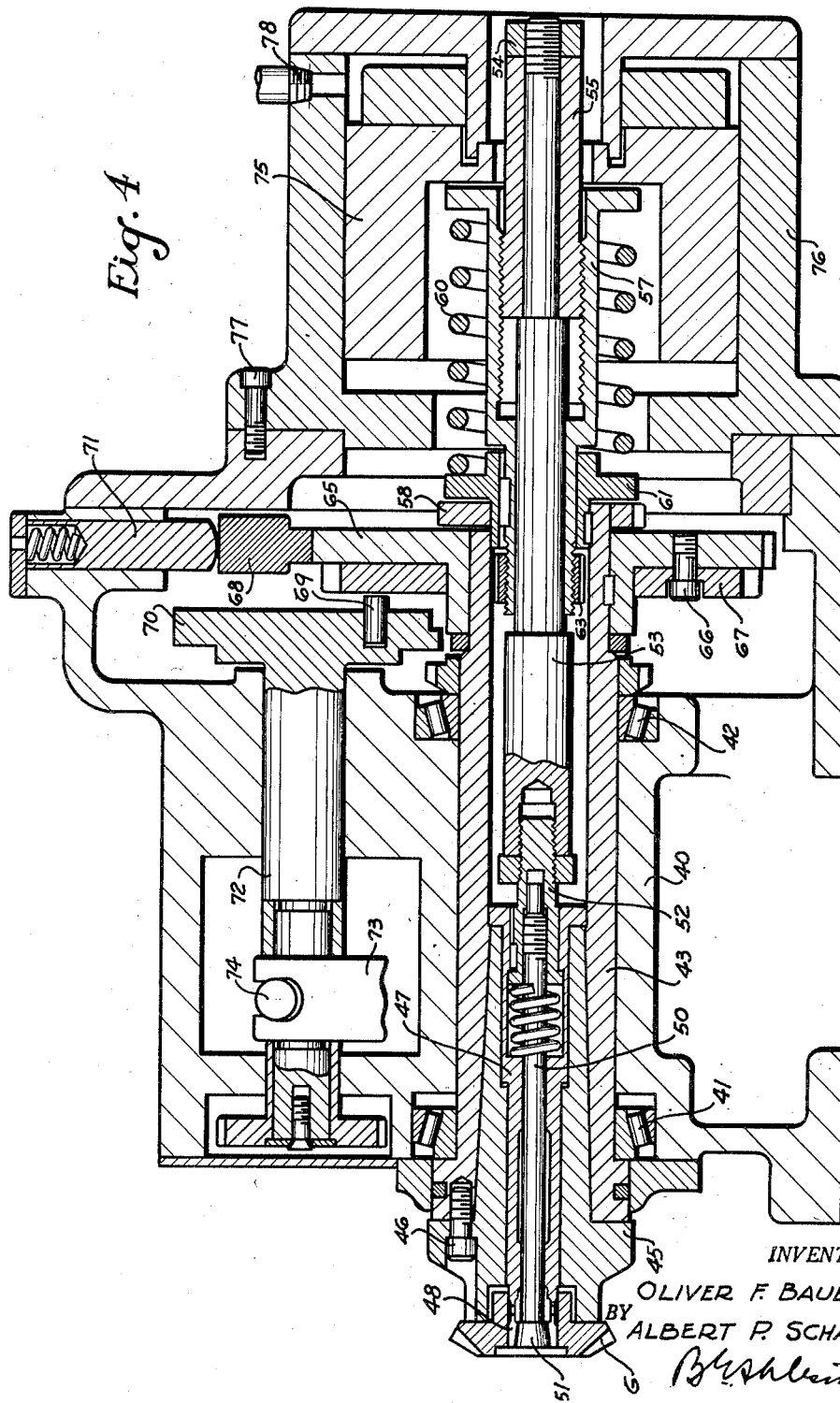

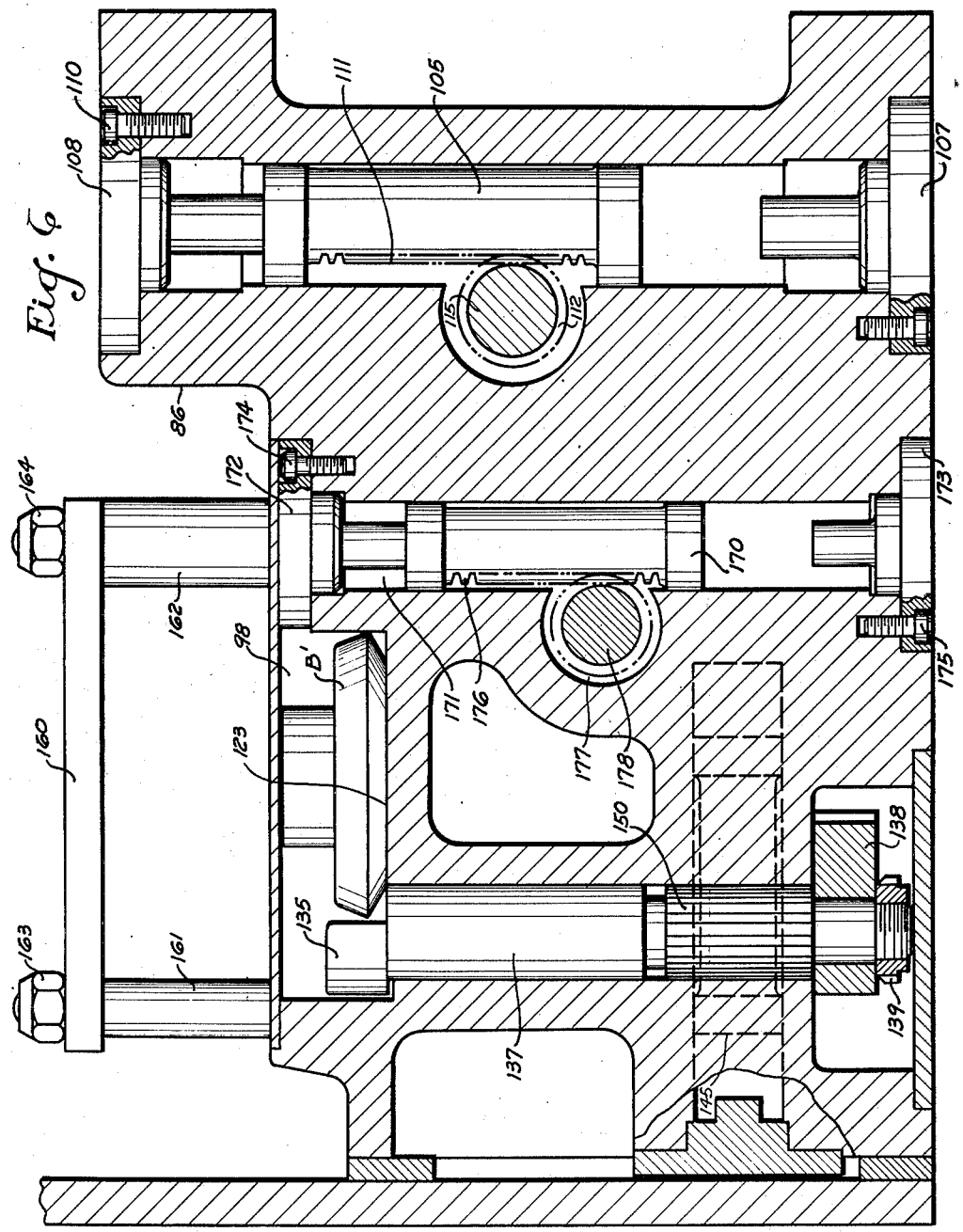

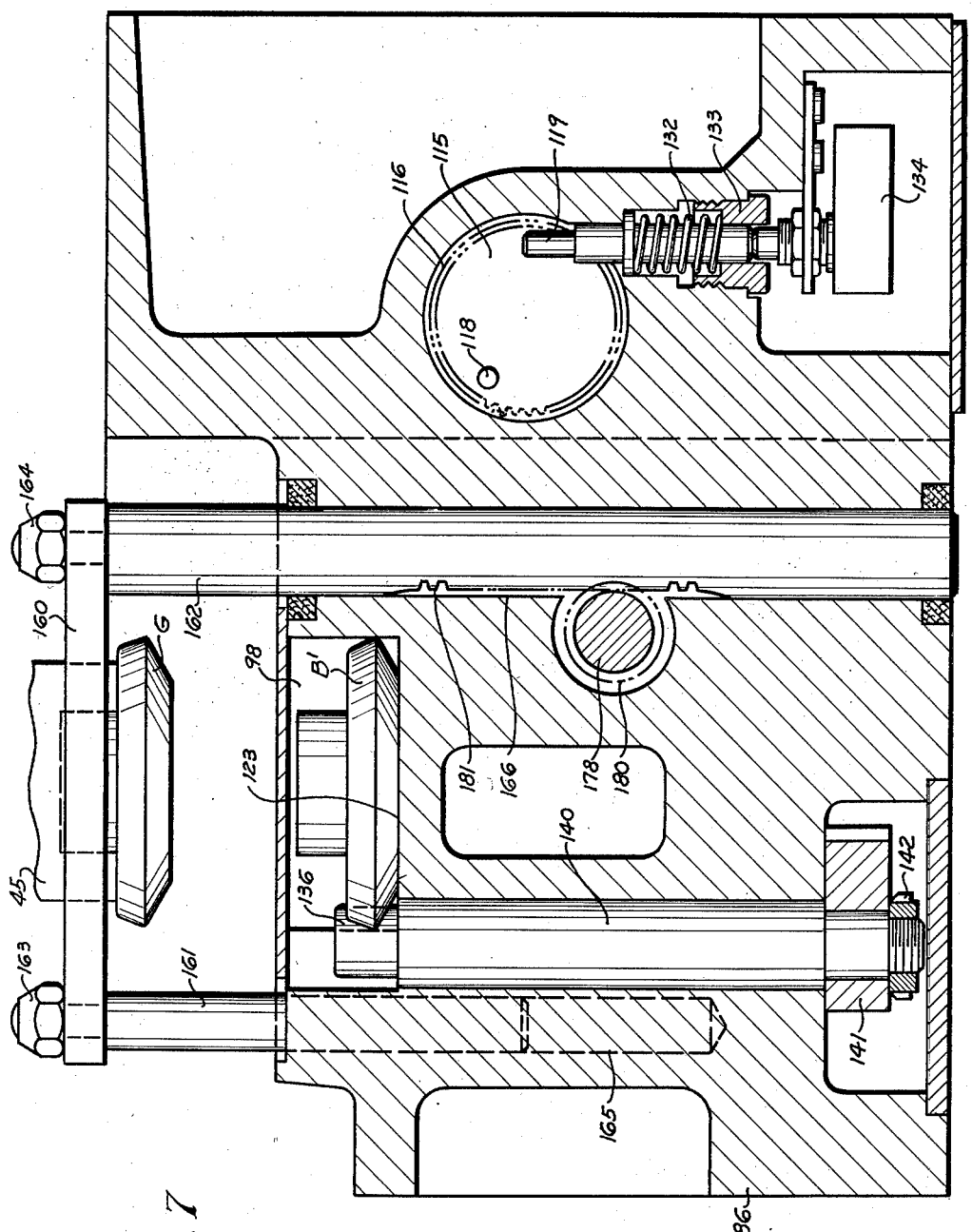

Jan. 2, 1951    O. F. BAUER ET AL    2,536,413
MACHINE FOR PRODUCING GEARS
Filed May 30, 1945    17 Sheets-Sheet 7
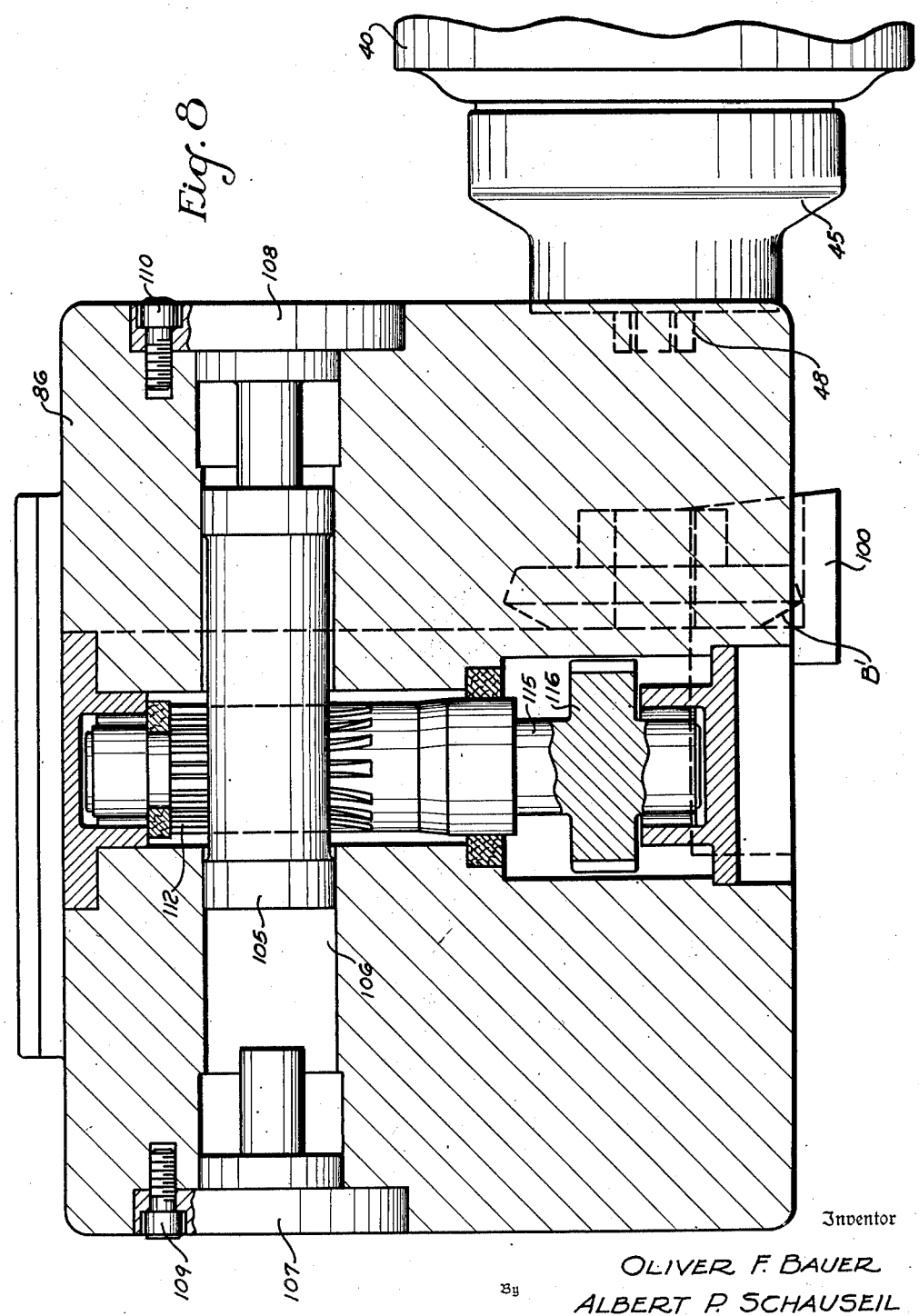
Inventor
OLIVER F. BAUER
ALBERT P. SCHAUSEIL
By BESchlesinger Attorney Inventor
OLIVER F. BAUER
ALBERT P. SCHAUSEIL Jan. 2, 1951     O. F. BAUER ET AL     2,536,413
MACHINE FOR PRODUCING GEARS Filed May 30, 1945     17 Sheets-Sheet 9

Inventor
OLIVER F. BAUER
ALBERT P. SCHAUSEIL
By   *B. F. Shlesinger* Attorney

Jan. 2, 1951     O. F. BAUER ET AL     2,536,413
MACHINE FOR PRODUCING GEARS

Filed May 30, 1945     17 Sheets-Sheet 11

Inventor
OLIVER F. BAUER
ALBERT P. SCHAUSEIL
By B. Schlesinger Attorney

Jan. 2, 1951   O. F. BAUER ET AL   2,536,413
MACHINE FOR PRODUCING GEARS
Filed May 30, 1945   17 Sheets-Sheet 12
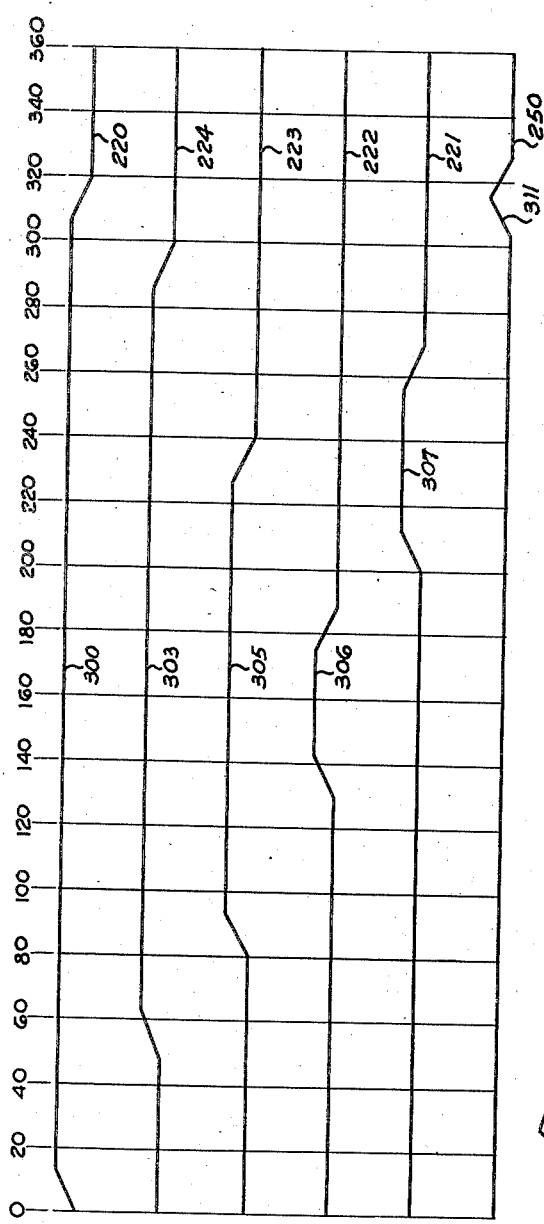
Fig. 14
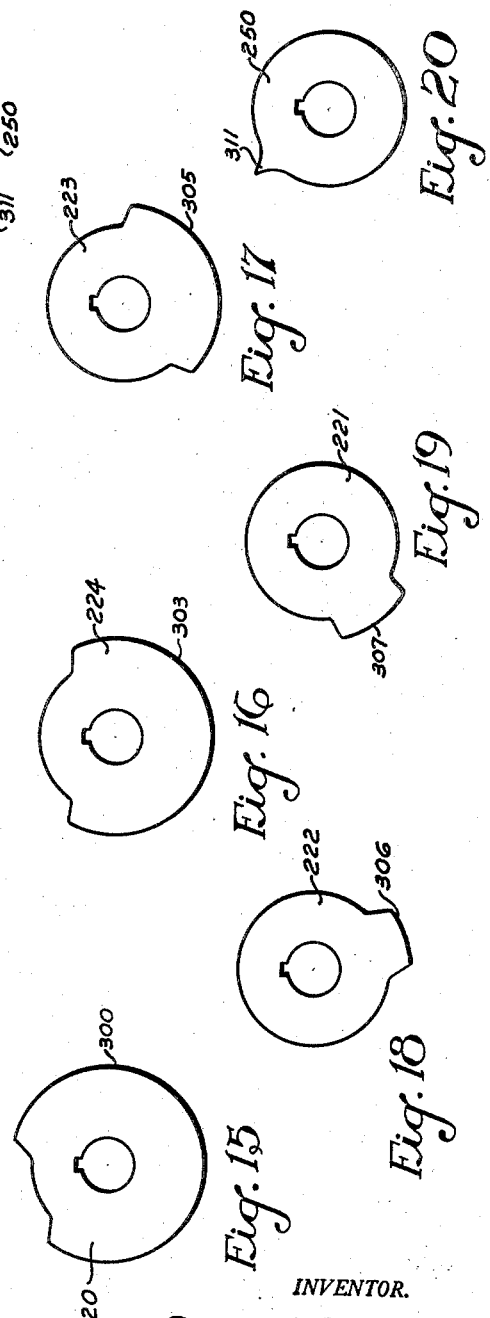
Fig. 15
Fig. 16
Fig. 17
Fig. 18
Fig. 19
Fig. 20
INVENTOR.
OLIVER F. BAUER
BY ALBERT P. SCHAUSEIL Jan. 2, 1951     O. F. BAUER ET AL     2,536,413
MACHINE FOR PRODUCING GEARS Filed May 30, 1945     17 Sheets-Sheet 13

Inventor
OLIVER F. BAUER
ALBERT P. SCHAUSEIL
By
Schlesinger Attorney

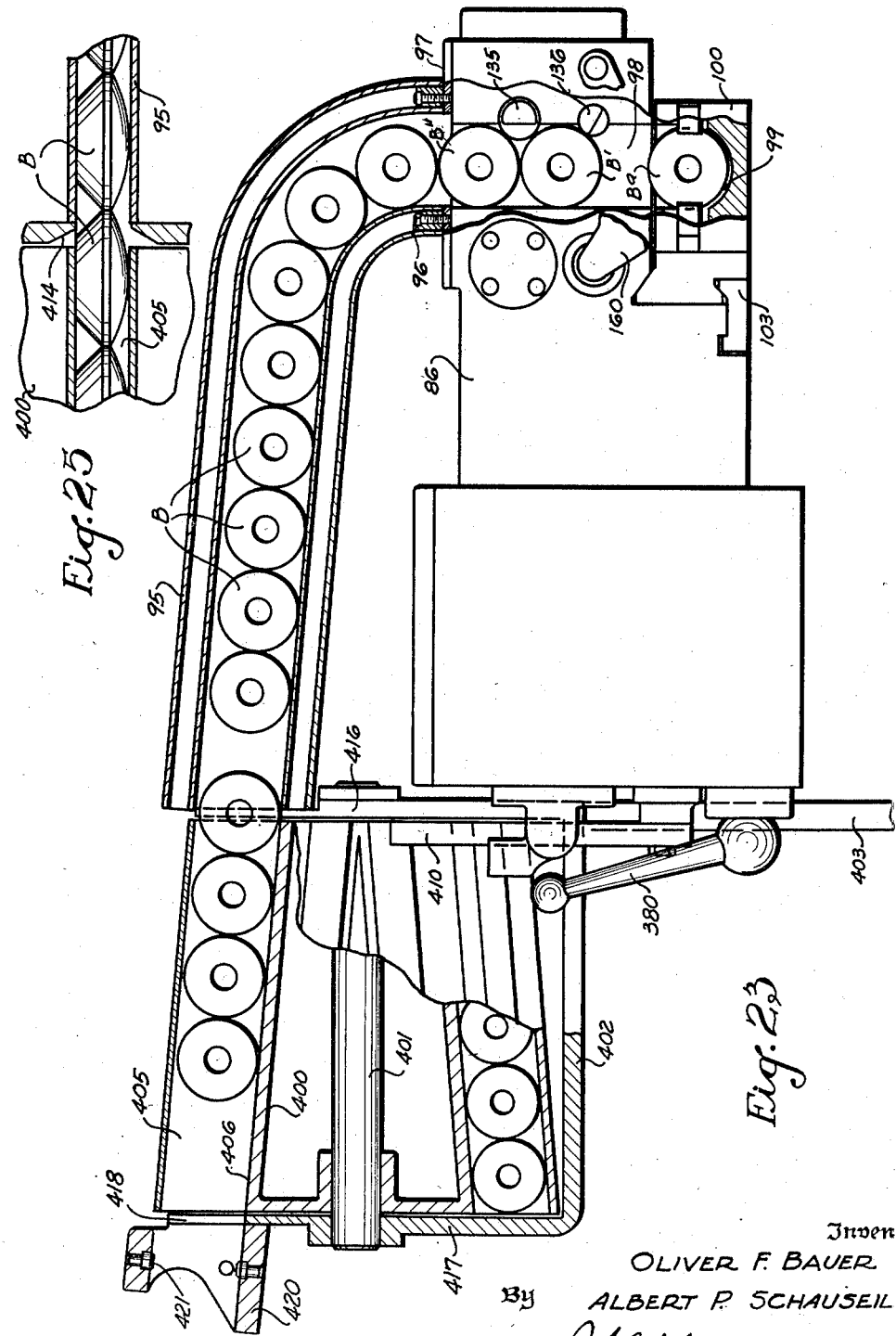

Jan. 2, 1951     O. F. BAUER ET AL     2,536,413
MACHINE FOR PRODUCING GEARS
Filed May 30, 1945     17 Sheets-Sheet 15
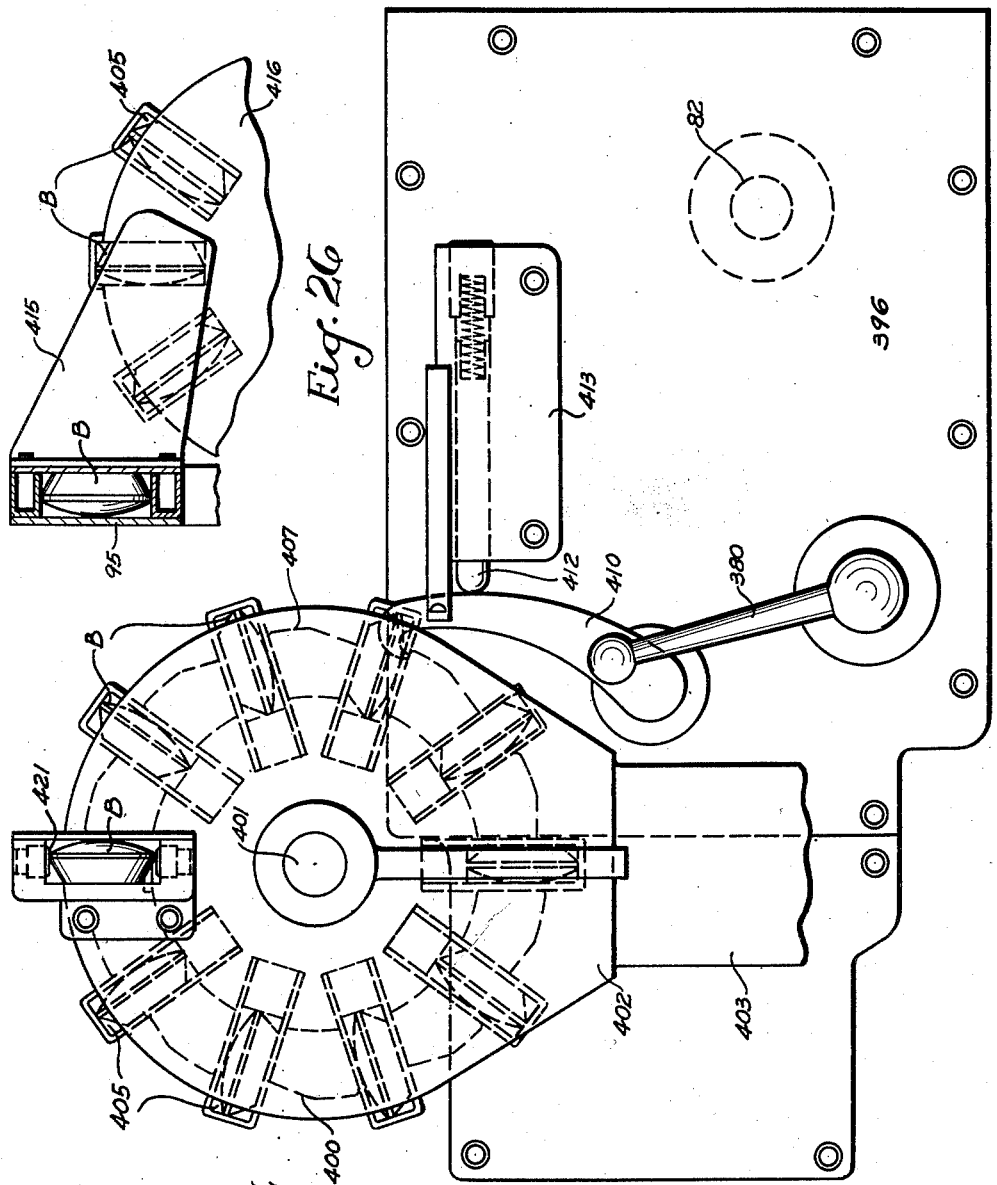
Inventor
OLIVER F. BAUER
By ALBERT P. SCHAUSEIL Jan. 2, 1951　　　　O. F. BAUER ET AL　　　　2,536,413
MACHINE FOR PRODUCING GEARS Filed May 30, 1945　　　　　　　　　　　　　　　17 Sheets-Sheet 17

Inventor
OLIVER F. BAUER
ALBERT P. SCHAUSEIL
By /s/ Attorney

Patented Jan. 2, 1951

2,536,413

UNITED STATES PATENT OFFICE 2,536,413

MACHINE FOR PRODUCING GEARS

Oliver F. Bauer, East Rochester, and Albert P. Schauseil, Rochester, N. Y., assignors to Gleason Works, Rochester, N. Y., a corporation of New York Application May 30, 1945, Serial No. 596,734

14 Claims. (Cl. 90—1)

The present invention relates to machine tools and to mechanisms for automatically loading and unloading the work from machine tools. In particular the invention relates to machines for producing gears and to mechanisms for automatically loading gear blanks on such machines.

One object of the invention is to provide an improved mechanism of the character described which will be much simpler in construction, more direct in operation, and more compact than gear loading mechanisms heretofore built.

Another object of the invention is to provide a loading mechanism which can be interlocked in operation with the gear cutting or other machining operation of the machine on which the loading mechanism is used so that on completion of the machining operations on a workpiece, the completed workpiece is automatically withdrawn from working position, dechucked, and stripped from the work spindle, and thereupon a new workpiece is automatically loaded on the work spindle, chucked, and then moved into working position and the machining operations of the machine are then restarted.

A further object of the invention is to provide a loading mechanism having a simple type of magazine arranged to cooperate therewith and to supply blanks thereto and having room for a large number of workpieces which are automatically fed successively to the loading mechanism so that after the magazine is loaded, the gear-cutting or other machine, on which the loading mechanism is employed, may operate for a long period of time automatically, producing a large number of gears or other articles, without attention from the operator.

A further object of the invention is to provide a loading mechanism having very simple means for transferring the workpieces from the magazine to the work spindle.

A further object of the invention is to provide a loading mechanism in which the operations of dechucking, stripping, chucking, and returning the work to work position are all timed relative to one another and so interlocked that they cannot get out of sequence.

Still a further object of the invention is to provide a simple and compact type of loading mechanism which may be adapted for use on standard forms of gear cutting machines with but slight modification of such machines.

Other objects of the invention will be apparent hereinafter from the specification and from the recital of the appended claims.

In the drawings:

Fig. 2 is an elevational view looking at one side of the workhead of the machine and showing the loading mechanism in two different positions, viz., in dotted lines in withdrawn or inoperative position and in full lines in operative or loading position;

Fig. 3 is a side elevational view, looking at the opposite side of the workhead, and again showing the two positions of the loading mechanism, in dotted and in full lines, respectively;

Fig. 4 is a longitudinal sectional view through the workhead of the machine;

Fig. 6 is a sectional view taken on the line 6—6 of Fig. 5;

Fig. 7 is a sectional view taken on the line 7—7 of Fig. 5;

Fig. 8 is a sectional view taken on the line 8—8 of Fig. 5;

Fig. 14 is a diagrammatic view showing layouts of the several cams which control the operation of the loading mechanism;

Figure 5:
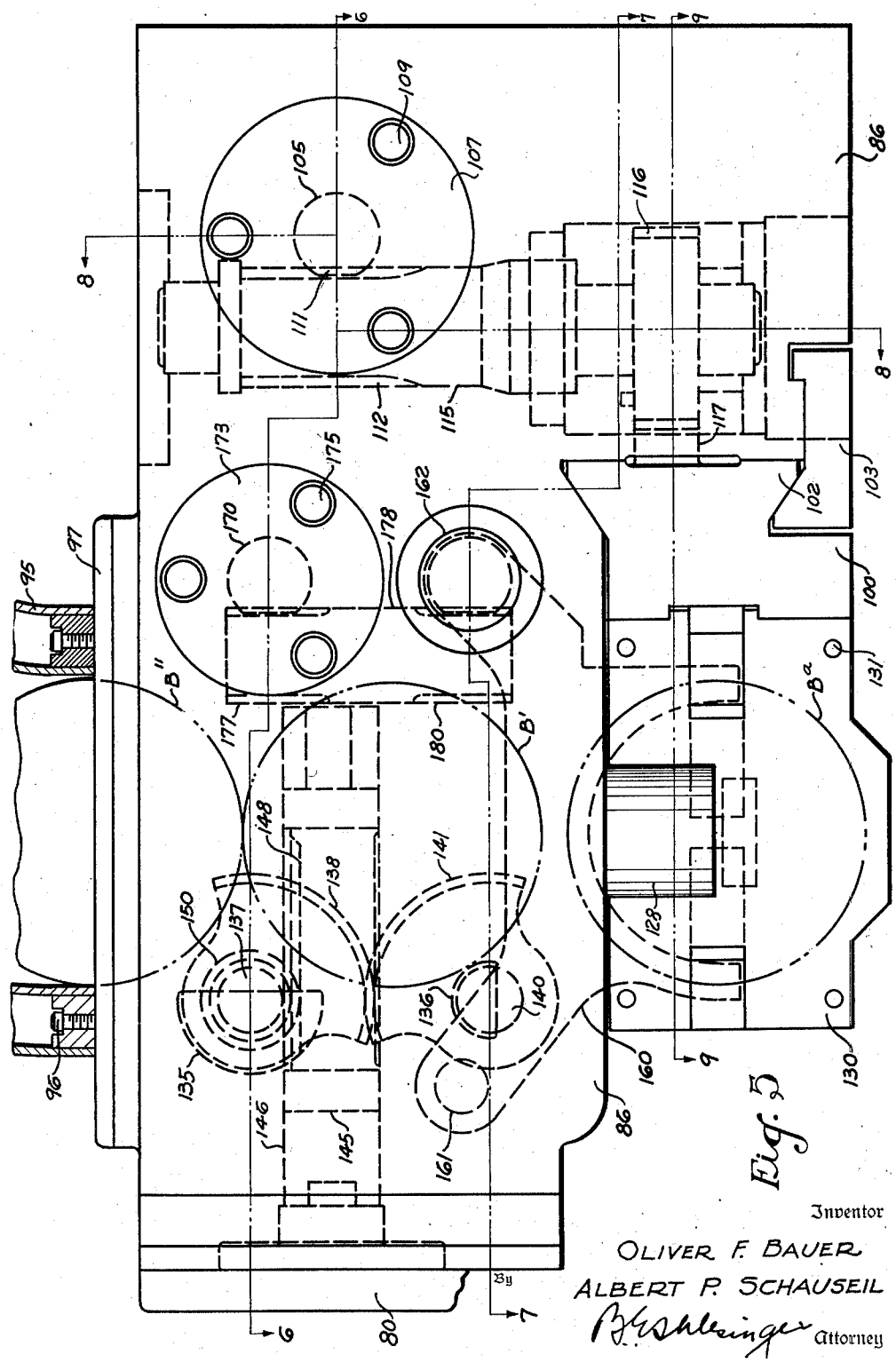
Fig. 5 is an elevational view on an enlarged scale looking at one end of the loading unit.
Figures 21, 22:
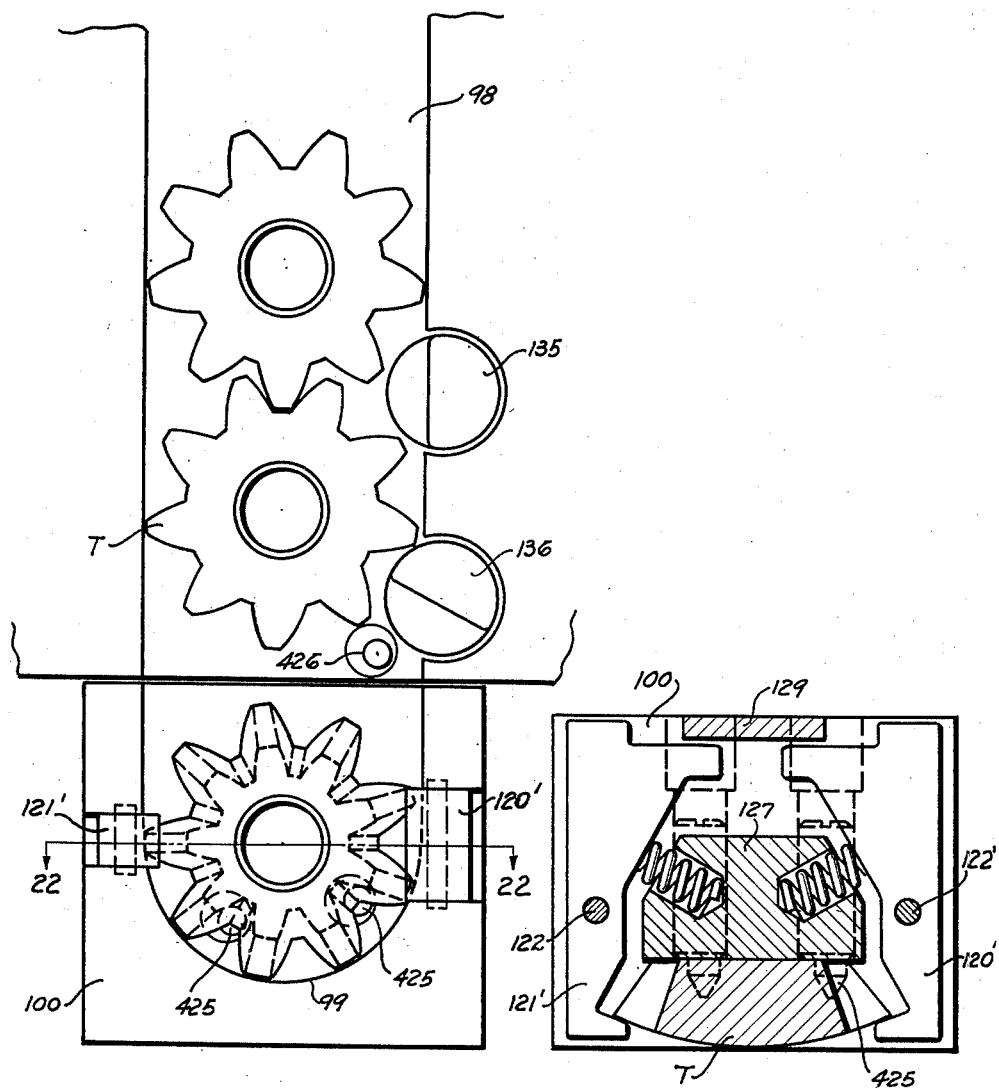
Figure 27:
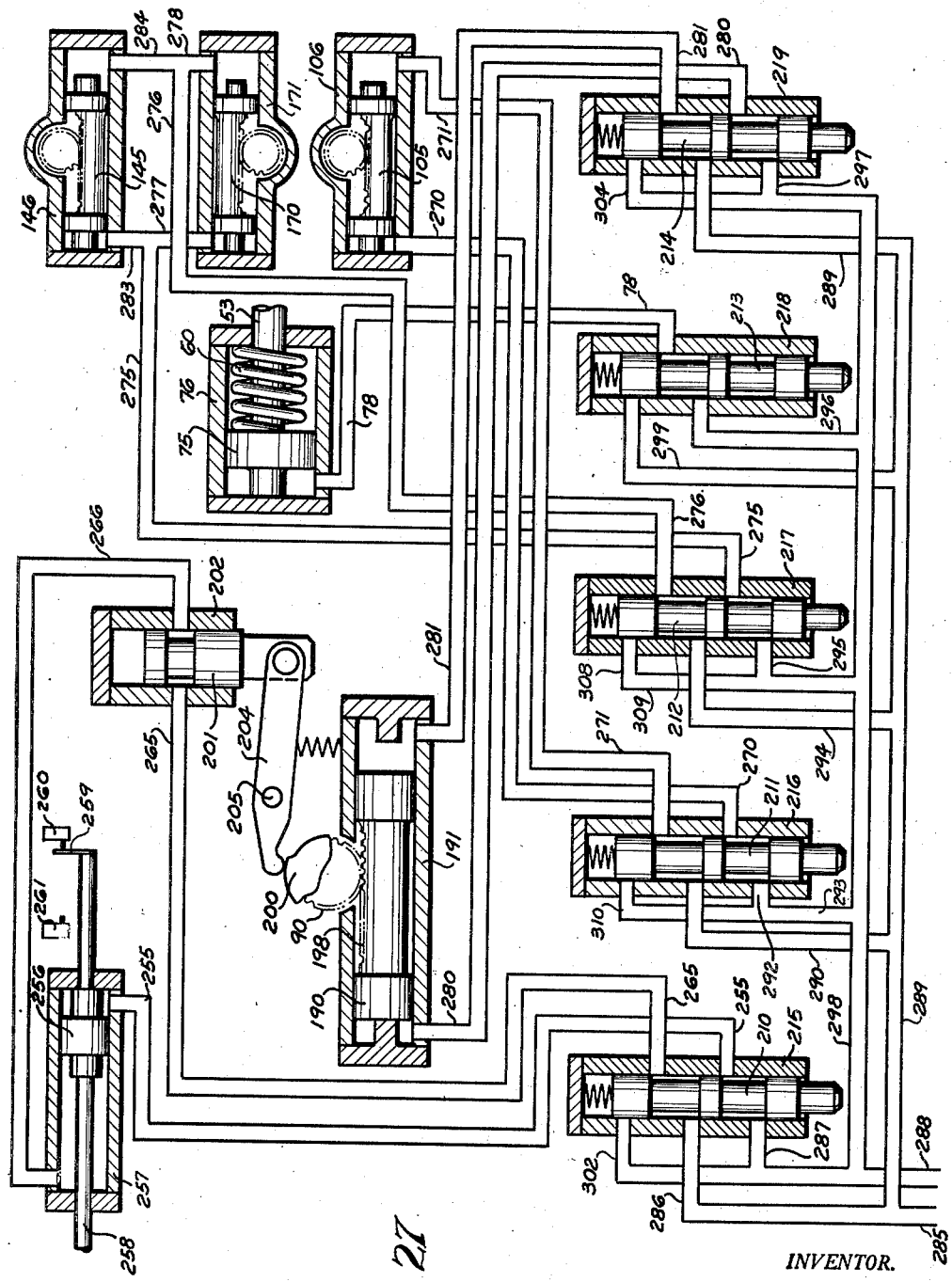
Figure 28:
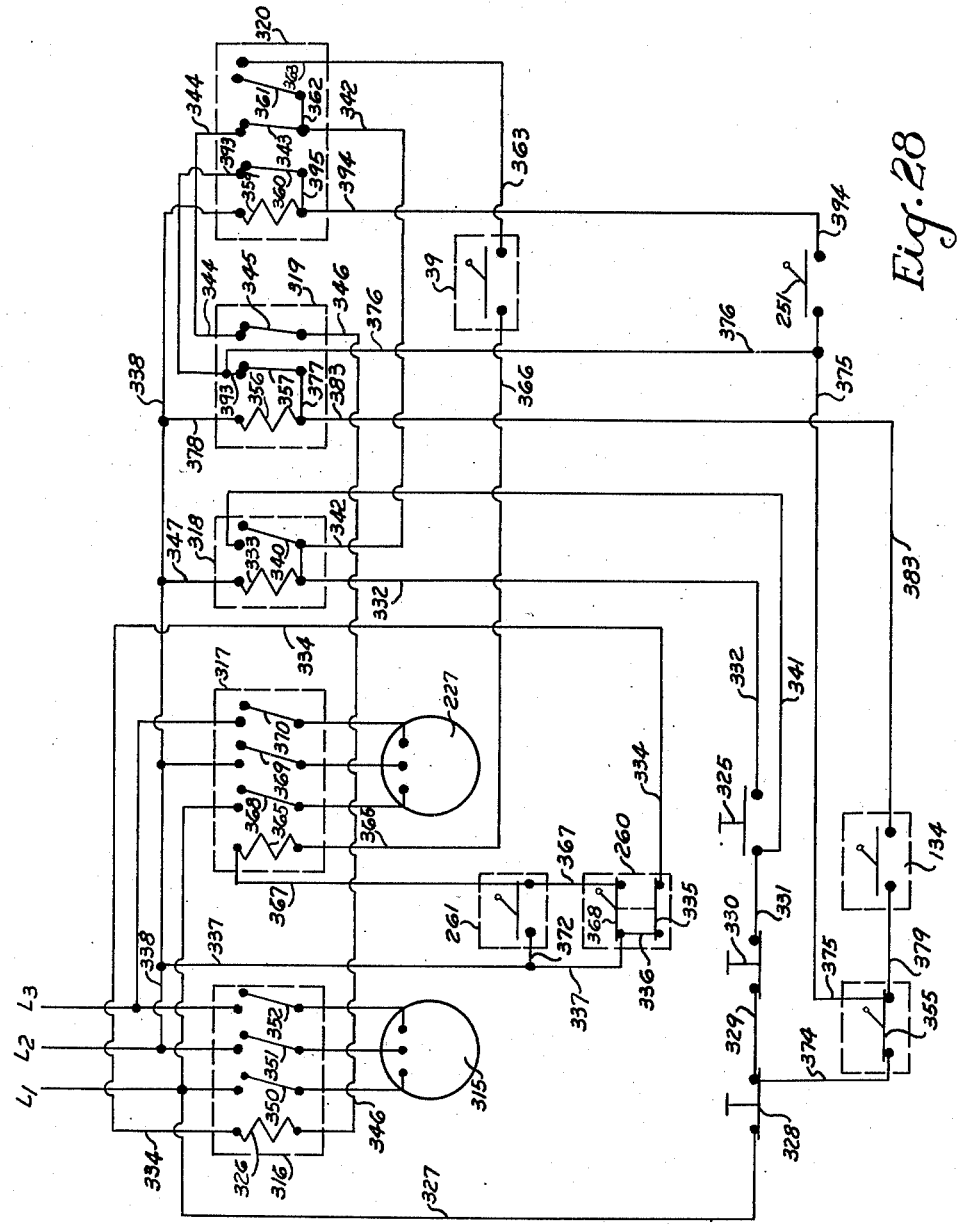

Figs. 15 to 20 inclusive are detail views of these several cams;

Fig. 21 is a fragmentary view showing how the loading mechanism may be modified in order to use it for loading gear blanks which have their teeth previously cut;

Fig. 22 is a section through the modified loader taken on the line 22—22 of Fig. 21;

Fig. 23 is a view looking at the loading mechanism from the end opposite that shown in Fig. 5, and showing in section the magazine and the trough or channel through which blanks move from the magazine to the transfer or loader member;

Fig. 24 is a side elevational view of the loading unit and magazine, showing particularly the mechanism for indexing the magazine;

Fig. 25 is a developed fragmentary sectional view through aligned portions of the magazine and channel;

Fig. 26 is a fragmentary view showing the channel in section and looking at the inner end of the magazine, and showing the guard plate which prevents blanks from dropping out of the magazine when the loading mechanism is swung to inoperative position;

Fig. 27 is a diagrammatic view, showing the hydraulic circuit for the fluid-pressure operated parts of the machine; and Fig. 28 is a diagrammatic view showing one way in which the machine may be wired electrically to perform its functions.

The invention is illustrated as applied to a machine of the type disclosed in the pending United States application of Clarence T. Galloway, Serial No. 522,924, filed February 18, 1944, now Patent No. 2,448,426, issued August 31, 1948. In this machine, a rotary disc milling cutter is employed that has a plurality of roughing blades followed by a plurality of finishing blades, and that has a peripheral gap between its last finishing blade and its first roughing blade. In operation, the cutter is rotated in engagement with the work, and during each revolution is also fed back and forth across the face of the work to rough-cut and finish-cut successively a tooth space of the work; and, when the gap in the cutter is abreast of the work, the work is indexed. Thus, in this machine a tooth space of the work is finished on each revolution of the cutter, and when the cutter has made as many revolutions as there are tooth spaces in the gear to be produced, the gear is finished.

In the machine as heretofore built, the automatic stop mechanism of the machine trips when the gear is finished and the machine is stopped. The operator then moves the completed gear from cutting to loading position manually by movement of the sliding base on which the workpiece is mounted; he manually dechucks the completed gear; he manually removes the dechucked gear from the work spindle; he manually chucks a new blank; he manually causes the sliding base to be moved back into operative position again; and then he manually restarts the machine.

In the machine as built according to the present invention, all these operations are effected automatically. For this purpose, a loading unit is pivotally mounted on the workhead of the machine to be swung up out of the way when the workhead and sliding base are in cutting position and to be swung down into operative position when the workhead and sliding base are in loading position. The loading unit has space for a plurality of gear blanks and it includes a stripper and a transfer or loader member. When the automatic stop mechanism of the machine trips on completion of a gear, it stops the main drive motor as before, that is, the motor which drives the cutter and the index mechanism, but it starts another motor which actuates the loading mechanism. Through this mechanism, the sliding base is withdrawn from operative position; the loading unit is swung down into operative position, causing the stripper to engage behind the completed gear on the work spindle; then the gear is dechucked; the stripper is moved forward axially of the work spindle to strip the gear from the work spindle; a detent is rotated to release the lowermost blank in the loading unit and allow it to drop into a pocket in the transfer member, while a second detent engages under the next lowermost blank to prevent it from following the first blank into the transfer member; then the stripper is returned to initial position; the second detent is rotated back to inoperative position; and the first detent back to operative position so that the now lowermost blank in the stack rests on the first detent; then the transfer member is moved toward the work spindle to push the blank, which it carries, onto the work spindle; the chucking mechanism is actuated to chuck this blank; the transfer member is returned to initial position; the loading and control units are then swung up to inoperative position; the sliding base is returned to operative position; the loader motor is stopped; and the main drive motor of the machine is restarted to cause the machine to start cutting the newly chucked blank.

The movements of the sliding base between cutting and loading positions, the movements of the loading unit between inoperative and loading positions, the dechucking and chucking operations, the stripping and loading operations, and the movements of the detents, are all fluid-pressure actuated under control of a series of cams that are mounted in the loading unit and driven by the loader motor. The starting of this motor is effected through operation of the automatic stop mechanism of the machine as described. Its stoppage at the end of the loading operation is effected by a limit switch which is tripped by a cam driven by the motor itself. A safety valve interlocks the movements of the sliding base and of the loading mechanism and prevents the sliding base from being moved back into operative position while the loading unit itself is in operative position. A limit switch insures that the cutter is in correct position before the loading mechanism starts to function.

In the loading mechanism of the invention, the transfer of blanks from the loading unit to the work spindle is a straight-line operation. No turning of the blanks is required as is the case with prior types of loading mechanisms.

There is room for several blanks in the loading unit itself but if desired, a magazine may be employed in conjunction with the loading unit so as to permit operation of the machine for a much longer period without attention of the operator than would be possible if only the loading unit itself were filled with blanks. A preferred form of magazine is shown in the drawings. This is a rotary drum of general conical shape having a series of radial slots extending from front to back of the drum, in each of which a plurality of blanks can be placed. The drum is mounted on a stationary part of the machine and is adapted to be indexed by movement of the loader unit between inoperative and loading positions so that each time that the loading unit is moved a new blank is dropped from the magazine into the loader unit. Thus, the machine will continue to run without attention of the operator until all of the blanks in the loading unit and magazine have been cut.

In the drawings, the base or frame of the machine is denoted at 30. It is formed on its upper face with two pairs of spaced ways 31 and 32 which extend at right angles to each other. The cutter carriage 34 is mounted to reciprocate on the ways 31. The sliding base 35 is mounted to reciprocate on the ways 32.

Rotatably mounted on the cutter carriage 34 is the cutter C. It is provided with a plurality of cutting segments 36 which are secured to the upper face of the cutter and which extend part way only around its periphery. In the instance shown, each segment has four cutting blades. Some of the blades of the cutter are roughing blades and some are finishing blades. The roughing blades precede the finishing blades in the direction of rotation of the cutter and there is a gap 33 between the last finishing blade and the first roughing blade as clearly shown in Fig. 1. This gap 33 is of sufficient angular extent to permit of indexing the gear blank, which is being cut, when the gap is abreast of the gear, without withdrawal of the blank from the cutter. It is also of sufficient angular extent to permit of a completed gear being removed from the work spindle and a new blank loaded thereon without interfering with the cutter.

To insure that, when the cutting operation is completed, the cutter will stop with its gap abreast of the blank, there is a limit switch 39 mounted on the cutter carriage 34 in position to be tripped by a cam 37 which is secured to the cutter. The limit switch is arranged, as will be described further hereinafter, in the starting circuit of the motor which actuates the loading mechanism. This motor cannot be started, therefore, until the limit switch is closed. The cam 37 is so positioned circumferentially about the cutter C that it closes limit switch 39 when the gap 33 in the cutter is abreast of the blank.

Mounted on the sliding base 35 for rectilinear adjustment thereon in a direction at right angles to the direction of movement of the sliding base is a plate 38 which is adapted to be secured in any adjusted position on the sliding base by T-bolts 44 (Figs. 2 and 3). Mounted on the plate 38 for angular adjustment thereon is the workhead 40. The workhead is adapted to be secured in any adjusted position by T-bolts 48. These adjustments are the usual adjustments of the machine and are for the purposes described more fully in the Galloway application above mentioned.

Journaled in the workhead on spaced antifriction bearings 41 and 42 (Fig. 4) is the work spindle 43. The bore of the spindle is tapered at the front end of the spindle in the usual manner to receive the work arbor 45. The arbor is adapted to be secured within the bore of the spindle by screws 46.

Mounted within the bore of the arbor is a collet member 47 having slotted expansible gripping jaws 48 at its forward end. The collet member 47 is adapted to be actuated by a draw-rod 50 which has a tapered nose 51 and which is adapted to be reciprocated within the bore of the collet. When the draw-rod is pulled rearwardly in the collet member, the jaws 48 of the collet member are expanded within the bore of the gear blank that is to be cut, to grip that blank and clamp it to the arbor and work spindle. When the draw-rod is moved forwardly, the collet and gear blank are released.

The draw-rod 50 is threaded at its rear end into a coupling member 52 which in turn is threaded into the front end of a draw-bar 53. The draw-bar is secured by a nut 54 to a nipple 55 whose inner end seats against a shoulder formed on the draw-bar. The nipple threads into a headed sleeve member 57. Keyed to the sleeve member 57 is a collar 58, and interposed between the collar 58 and the head of the sleeve member 57 is a coil-spring 60. This spring serves constantly to urge the draw-bar 53 rearwardly in the work spindle 43. This causes the draw-rod 50 to be drawn rearwardly in the collect member 47 to effect expansion of the collet and clamping of the work. The rearward movement of the draw-bar is limited by the nut 63 which threads on the sleeve member 57 and which is adapted to engage the collar 61.

Keyed to the work spindle 43 is a notched index plate 65, and fastened to this plate by screws 66 is a Geneva wheel 67. The notches of the index plate 65 are adapted to be engaged successively by the lock-dog 68 to hold the work spindle against rotation during cutting, while the notches of the Geneva wheel 67 are adapted to be engaged successively by the pin 69 to index the spindle when the locking-dog 68 is released. The locking-dog is urged constantly toward locking position by a spring-pressed plunger 71 which is housed in the workhead. The pin 69 is carried by a plate 70 that is integral with a shaft 72 that extends parallel to the work spindle and that is movable axially to move the pin 69 into and out of engagement with the Geneva wheel. The movement of the shaft 72 is effected by oscillation of a lever-arm 73, that has a forked end which engages a pin 74 that is secured to the shaft 72. The lever-arm is oscillated by a cam as described more specifically in the Galloway application No. 522,924 above mentioned.

The cutter C is driven from the main drive motor 315 (Fig. 28) of the machine through suitable gearing not here shown. The index mechanism is actuated by this same motor. The cutter and index drives are fully described in the Galloway application and for a more detailed description of same reference may be had to that application.

The draw-bar 53 and draw-bar 50 are adapted to be moved to collet-releasing position by application of fluid-pressure to the rear end of a piston 75 which is housed in a cylinder 76. This cylinder is secured by screws 77 to the rear of the workhead. The front end of the piston 75 is recessed to receive the sleeve member 57 and coil-spring 60, while the draw-rod 53 and nipple 55 pass through the piston. The pressure fluid may be supplied to the rear end of the piston 75 or exhausted therefrom through a duct 78 drilled in the side wall of the cylinder 76.

Figure 1:
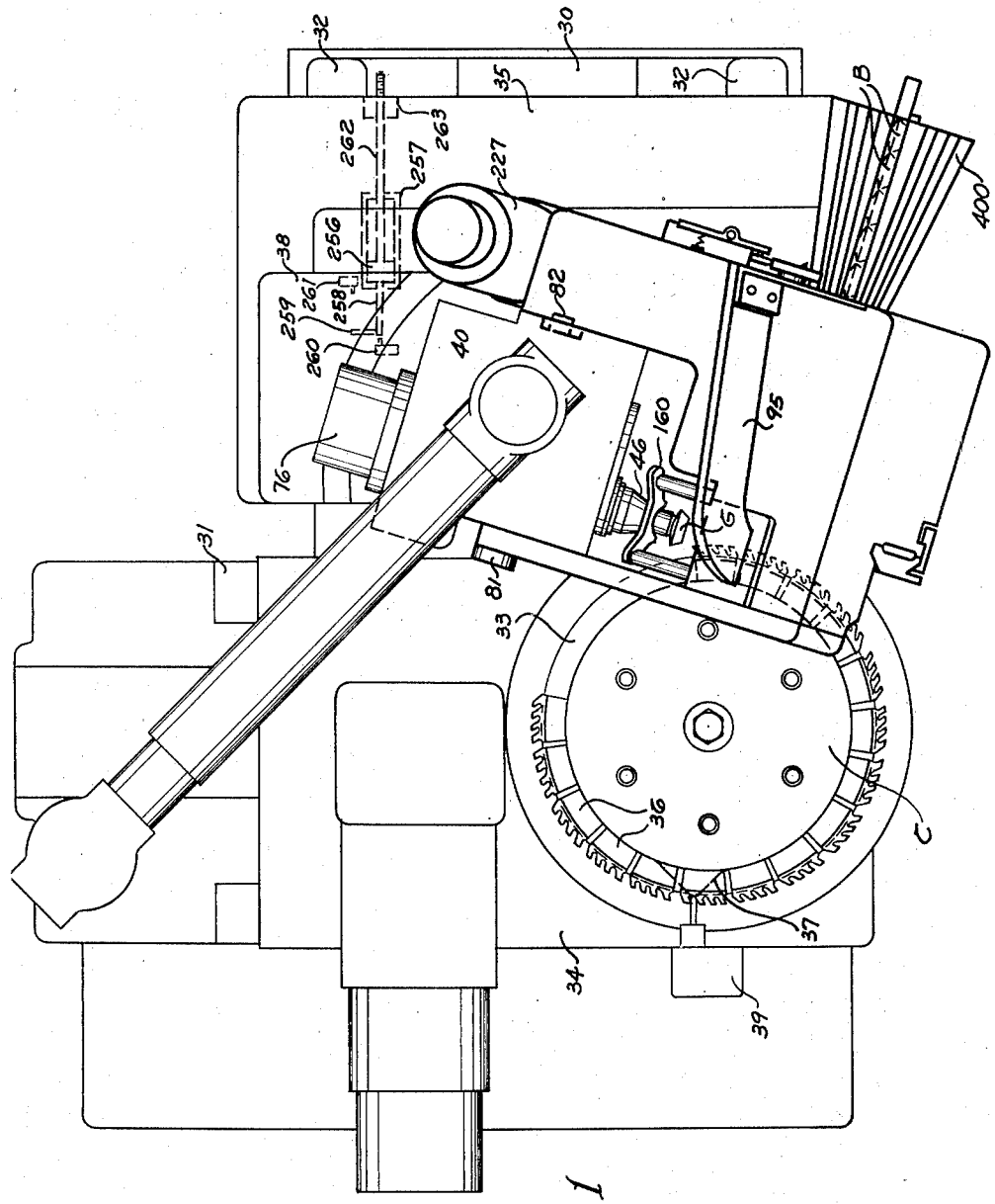
Fig. 1 is a plan view of a bevel gear cutting machine of known type equipped with a loading mechanism constructed according to one embodiment of the present invention.

The loading mechanism of the machine is designated as a whole at 80 in Figs. 1, 2, and 3. It is pivotally mounted on the workhead 40. During cutting of a gear blank, the loading mechanism occupies the dotted line position shown in Figs. 2 and 3 where it is out of the way and does not interfere with the cutting operation. For stripping a completed gear from the work spindle, after dechucking, and for loading a new blank on the arbor, the loading mechanism is swung down to the full line position shown in these figures. For its pivotal movement, the loading mechanism is mounted on two aligned pins 81 and 82. The pin 81 is fixed at one side of the workhead 40, while the pin 82 is mounted on a rotary crank-plate 83 (Fig. 12) that is rotatably journaled in a bushing 84 which is secured in the opposite side of the workhead.

The crank plate 83 is integral with a shaft 85 which is journaled in the loading-unit main casting 86 on antifriction bearings 87 and 88. The shaft 85 has a spur pinion 90 keyed to it intermediate its ends. Rotation of the shaft is effected by rotation of this pinion in a manner which will be described more particularly hereinafter. It will be obvious, however, that when the shaft 85 is rotated, the crank plate 83 will be revolved about the relatively fixed crank pin 82 and the loading mechanism may be swung from inoperative to loading position and vice versa.

After the work has been dechucked and the loading unit is down in operative position, the completed gear G is adapted to be stripped from the work arbor by a stripper 100 (Figs. 1, 5, 6, and 7). The stripper is yoke-shaped and so positioned that it will engage over the work arbor behind the gear when the loading mechanism is lowered into operative position.

The casting 86 has a chute 95 (Fig. 23) secured to its upper face by screws 96 which fasten the chute to the cover-plate 97 of the casting. The chute is adapted to hold a plurality of gear blanks B and is so constructed that the blanks will roll down the chute and into a channel 98 (Figs. 6, 7, and 23) formed in the casting 86. From the channel 98, the blanks are adapted to drop successively into a pocket 99 formed in a transfer member or loader 100. The pocket 99 is generally U-shaped having a rounded bottom wall to fit the contour of the blanks to be cut and having parallel side-walls which constitute extensions of the side walls of channel 98. The back of the pocket is open for the full width of the pocket so that a gear blank can readily be pulled axially out of the pocket after the jaws 48 of the collet member 47 have been expanded in the bore of the blank to secure the blank on the work arbor.

The loader 100 is reciprocable on the casting 86 so as to transfer a blank from the loading mechanism to the work arbor and then return the loader to initial position. The loader is guided in its movement by a dovetailed guide 102 which slides in a correspondingly shaped guideway formed in casting 86 and is held in the guideway by the gib 103 which is secured to this casting. Reciprocation of the loader is effected by reciprocation of a piston 105 (Figs. 5, 8, and 27) which is mounted to move in a cylinder 106 drilled in the casting 86. The two ends of this cylinder are closed by the end-plates 107 and 108, respectively, which are secured to the casting by screws 109 and 110, respectively. The piston 105 has rack teeth 111 cut in one side thereof which mesh with the teeth of a spur pinion 112 that is integral with a shaft 115. This shaft has a spur gear 116 formed integral with it near its lower end. This gear meshes with a rack 117 (Fig. 9) which is formed at one side of the loader.

The gear 116 also carries a pin 118 which is adapted in the rotation of the gear to engage a spring-pressed plunger 119 that is mounted in the casting 86. This plunger is normally pressed outwardly by the coil-spring 132 whose tension can be adjusted by the nut 133 which threads into the casting 86. When the plunger is pressed inwardly, it trips a limit switch 134 which is mounted in a recess in the casting 86 and whose function will be described hereinafter.

To hold the gear blank in the loader during the transfer movement and to keep the bore of the blank aligned with the collet 47 so that the blank can be slipped over the collapsed jaws 48 of the collet by the loader in its movement, there are two cooperating jaws 120 and 121 pivotally mounted in the sidewalls of the pocket 99 in two slots that are provided in the sides of the loader. The jaws are mounted on pivot pins 122 and 122′, respectively.

The jaws 120 and 121 are shaped to conform to the shape of the gear blanks which are to be cut. They are constantly urged to gripping position by coil-springs 124 and 125, respectively, which are mounted in recesses in post 127 that is integral with the loader and that extends upwardly between the two jaws. This post has a plane rear face 126 which is aligned with the front wall 123 (Figs. 6 and 7) of the channel 98 when the transfer member is in its starting or initial position. The face 126 of post 127 serves as a seat against which a gear blank may be held by the clamping jaws 120 and 121. Being plane, the seat 126 serves to square the blank up, so that the blank will be aligned axially with the work spindle in position to be pushed thereon by the transfer member.

Figure 10:
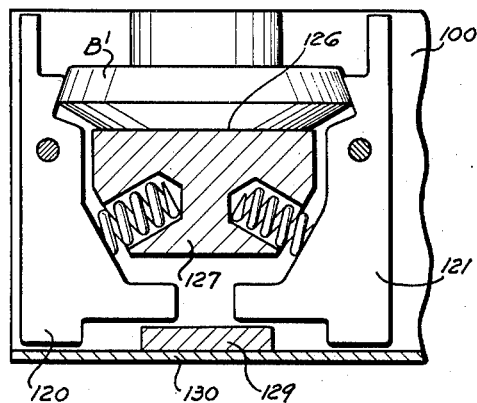
Fig. 10 is a fragmentary sectional view showing the loader or transfer member of Fig. 9 in the operation of transferring a workpiece to the work spindle.
Figure 9:
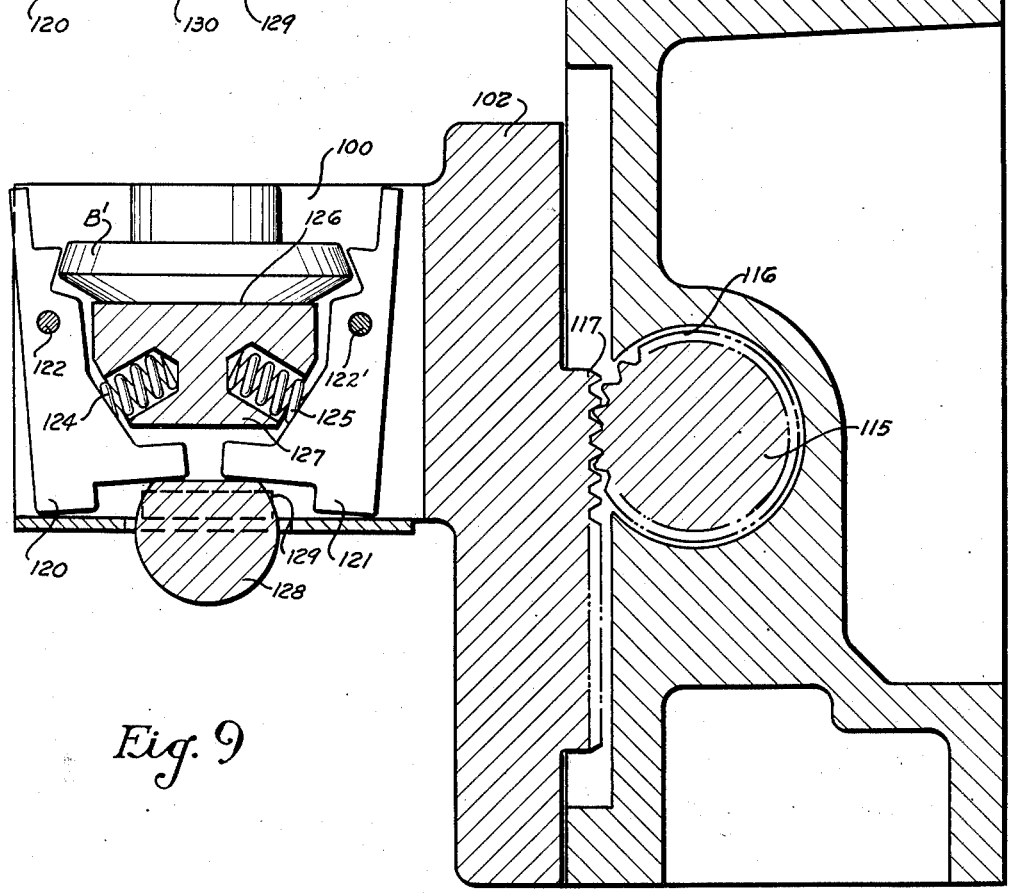
Fig. 9 is a sectional view taken approximately on the line 9—9 of Fig. 5.

When the loader is in initial position with its pocket 99 directly below the channel 98, the jaws 120 and 121 are held slightly open so that a gear blank can drop from the channel between the jaws into the pocket. For holding the jaws open, a stud 128 (Figs. 5 and 9) is provided. This stud is secured in the casting 86 in position to engage the tail portions of the jaws when the loader is in initial position shown in Fig. 9, and the stud is of a size, when in engagement with the jaws, to hold the jaws slightly open against the resistance of the springs 124 and 125. This stud 128, being fixed to the casting 86, is stationary relative to the movable transfer member or loader. Hence, when the loader moves in its transfer movement, the stud is left behind and the jaws are then closed to grip the work as shown in Fig. 10. Fig. 9 shows the positions of the parts when there is a blank B in the pocket of the loader and the loader is in registry with the channel 98 in casting 86, while Fig. 10 shows another position of the loader when the loader is being moved in the act of transferring a blank to the work spindle.

After the loader has pushed a gear blank over the gripping jaws 48 of the collet member 47, the draw-rod 50 is moved rearwardly to expand the collet jaws in the bore of the blank and grip the blank. Then the loader is moved back to its original position, clear of the blank. In this return movement, the gripping jaws 120 and 121 of the loader member slip over the now-chucked blank, rocking about their pivot pins 122 and 122′ against the resistance of the springs 124 and 125, respectively, to disengage themselves from the workpiece. To limit the inward movement of the clamping jaws as the loader moves back empty and to prevent the jaws from closing too far, a stop-lug 129 is provided on the end plate 130 of the loader in such position as to engage the tail portions of the jaws, to stop their inward movement. The end-plate 130 is secured to the loader by screws 131 (Fig. 5).

During the transfer of a blank from the loading mechanism to the work spindle, it is necessary to prevent the blanks in the channel 98 from dropping down. It is also necessary to hold the other blanks in the channel 98 from falling on down when the lowermost blank in the channel is being dropped into the pocket of the loader. For these purposes two half-round buttons or stops 135 and 136 (Figs. 5, 6, and 7) are provided.

The stop button 135 is formed integral with a shaft 137 at one end thereof. This shaft is journaled in the casting 86 and to its opposite end is secured a spur gear segment 138. The segment is held on the shaft by a nut 139 that threads onto the shaft.

The stop button 136 is formed integral with a shaft 140 at one end thereof. This shaft is journaled in the casting 86 below the shaft 137 and parallel thereto. To the opposite end of this shaft 140 is secured a spur gear segment 141 which is held in place on the shaft by a nut 142 that threads onto the shaft.

The two segments 138 and 141 mesh with one another, and the two stop buttons 135 and 136 are so formed that when one is in operative position, the other is out of operative position. In Fig. 5, there are three gear blanks shown, which are designated $B_a$, B', and B'', respectively. The blank $B_a$ is in the pocket of the loader 100. The blank B', which is at this time the lowermost blank in the channel 98 of the casting 86, is held above the loader by the stop 136 which is then in operative position and engaging the periphery of blank B'. Stop 136 then carries the weight of all the blanks in the channel 98. To drop the lowermost blank B' into the transfer member 100 after the blank $B_a$ has been loaded on the work spindle and the pocket of the loader is empty, the shaft 137 is rocked clockwise. This brings the stop 135 into engagement with the periphery of the blank B'' and through operation of the segments 138 and 141 moves the stop 136 out of engagement with the blank B'.

The rocking movements of the stop buttons are effected by reciprocation of a piston 145 (Figs. 5, 6, and 27) which reciprocates in a cylinder 146 formed in the casting 86. This piston has rack teeth 148 formed on one side which engage and mesh with a spur gear 150 formed on the shaft 137. Thus, as the piston 145 is moved to the left from the position shown in Fig. 5, the shafts 137 and 140 are rocked in opposite directions to move the stop button 136 out of operative position and the stop button 135 into operative position. When the piston 145 is moved back to the right again, however, the stop 135 is moved out of operative position and the stop 136 back into operative position.

The stripper member 160 is carried by two spaced parallel rods or bars 161 and 162 to which the stripper is secured by the nuts 163 and 164. The rods 161 and 162 are mounted to slide in parallel holes 165 and 166 drilled in the casting 86.

Stripping is effected by moving the stripper member 160 forward axially of the work spindle after it has been engaged behind the gear to be stripped by the lowering of the loading unit. The stripping movement of the stripper and the subsequent return of the stripper to its initial position are produced by reciprocation of a piston 170 (Figs. 5, 6, and 27) which is movable in a cylinder 171 formed in the casting 86. The opposite ends of this cylinder are closed by cap members 172 and 173 which are secured in position by screws 174 and 175. The piston 170 has rack teeth 176 cut into one side of it. These rack teeth mesh with the teeth of a spur pinion 177 formed in the upper end of a shaft 178 that is journaled in the casting 86. At its lower end, the shaft 178 is provided with other pinion teeth 180 which mesh with rack teeth 181 cut into the side of the bar 162.

The movements of the loading mechanism to and from operative position are effected by reciprocation of a piston 190 (Figs. 11, 12, and 27) which is reciprocable in a cylinder 191 formed partially in the casting 86. The underside of this cylinder is formed by a bottom plate 192 which is secured to the casting 86. The cap plates 195 and 196 constitute the end walls of this cylinder. The piston 190 is provided with rack teeth 198 which mesh with the teeth 99 of shaft 85. Thus, as the piston 190 reciprocates, the shaft 85 is revolved in one direction or the other to rotate the crank plate 83 in one direction or the other and, through operation of the crank-pin 82, cause swing of the loading mechanism in one direction or the other.

Keyed to the pinion 90 is a cam 200. This cam is adapted to operate a shut-off valve 201 which is adapted to reciprocate in a sleeve 202 mounted within the casting 86. The valve 201 is pivotally connected to a lever 204 which is pivoted intermediate its ends in the casting 86 by means of a pin 205. This lever carries a button or follower 206 which engages and rides on the periphery of the cam 200.

The follower 206 is held in engagement with the cam 200 by a coil-spring 207 which is interposed between a lug 208 formed on the casting 86 and the lever 204. The purpose of the shut-off valve 201 will appear hereinafter.

The sliding base 35 is adapted to be moved between operative and loading positions to permit cutting of a gear and removal and chucking of a new blank, respectively, by reciprocation of the piston 256 (Figs. 1 and 27) which moves in the cylinder 257. The cylinder 257 is secured to the bed 30 of the machine, while the piston 256 is connected to the sliding base 35. The piston connection is through a piston rod 262 which projects from one side of the piston through one end wall of cylinder 257 and threads adjustably into a nut 263 that is fastened to sliding base 35. The piston 256 has a piston rod 258 which projects from its opposite side through the opposite end wall of the cylinder 257. The piston rod 258 has an enlarged head 259 at its outer end which is adapted to engage alternately with two limit switches 260 and 261 and trip these limit switches at the limits of movement of the piston 256. The purpose of these limit switches will appear hereinafter.

The movements of piston 256, of chuck piston 75 (Figs. 3 and 27), of the piston 145 (Figs. 5 and 27), which controls movement of the stop buttons 135 and 136, of the stripper piston 170 (Figs. 5, 6, and 27), of the piston 105 (Figs. 5, 6, 8, and 27) which operates the transfer member or loader, and of the piston 190 (Figs. 11, 12, and 27) which causes movement of the loading mechanism to and from operative position, are controlled by a series of valves 210, 211, 212, 213, and 214 (Figs. 11 and 27) which are mounted, respectively, in sleeves 215, 216, 217, 218, and 219 in the casting 86.

The valves 210 to 214 inclusive are adapted to be operated by cams 220, 221, 222, 223, and 224, respectively, which are keyed to a shaft 225 that is journaled in the casting 86. The shaft 225 is adapted to be revolved by a motor 227 (Figs. 1, 11, and 28) which is mounted on the casting 86. This motor drives shaft 225 through a worm 228 and a worm wheel 229. The cams 220, 221, 222, 223, and 224 operate the different valves 210, 211, 212, 213, and 214, respectively, through levers 230, 231, 232, 233, and 234, respectively.

All of these levers are constructed alike. One of them, the lever 233, is shown clearly in Fig. 12. The levers are pivotally mounted on a rod 236 which is secured in the casting 86 and which is mounted parallel to and slightly above and to one side of the shaft 225. Each of the levers has a nose or follower 237 which engages with the periphery of the cam which actuates that lever. Each of the levers is forked at its free end. Mounted in the furcations of each lever for rotatable adjustment therein is a pin 238. The pins 238 are adapted to engage the projecting lower stem portions of the valves which cooperate with the respective levers. The portion of each pin 238, which engages the stem of its valve, is eccentric of the journal portion 239 of the pin so that by rotatable adjustment of the pin in the furcations of the lever the movement of the valve itself can be adjusted.

The several valves 210, 211, 212, 213, and 214 are held in engagement with the pins 238 of their respective levers 230, 231, 232, 233, and 234 by coil-springs 240, 241, 242, 243, and 244, respectively. These springs are interposed between the upper ends of the valves and a cover-plate 245 which is secured to the casting 86.

Besides the cams already mentioned, there is an additional cam 250 (Figs. 11 and 20) keyed to the shaft 225. This cam is adapted to trip a limit switch 251 to stop the motor 227, as will be described more fully hereinafter. The limit switch 251 is mounted in the casting 86.

The valve 210 is connected through ports in the sleeve 215 and the duct 255 with one end of the cylinder 257 (Figs. 1 and 27). The valve 210 is connected to the opposite end of this cylinder through ports in the sleeve 215, the duct 265, ports in the sleeve 202 of valve 201, and the duct 266.

The valve 211 is connected with one side of the piston 105 through a duct 270, and is connected with the opposite side of this piston through a duct 271.

The valve 212 is connected with one side of the piston 170 by ducts 275 and 277, and it is connected to the opposite side of this piston by ducts 276 and 278. This same valve 212 controls the operation of the piston 145. One side of this piston is connected with the duct 275 by a duct 283 while the opposite side of this piston is connected with the duct 276 by a duct 284.

The valve 213 is connected with the chuck-piston 75 on the side opposite to that acted upon by the spring 60 through the duct 78, as already described.

The valve 214 is connected to opposite sides of the piston 190 (Figs. 11, 12, and 27), which effects the movement of the loading mechanism to and from operative position, by ducts 280 and 281, respectively.

The pressure fluid is supplied to the several valves from the duct 285.

The parts are shown in Fig. 27 in the positions which they occupy when the sliding base is in operative position and the loading mechanism is in its inoperative position. At this stage of the operation of the machine, the pressure fluid flows from the duct 285 through the duct 286, ports in the sleeve 215 of valve 210, the duct 265, ports in the sleeve 202 of the valve 201, and the duct 266 into one end of the cylinder 257 to hold the piston 256 to the right in Fig. 27. At this time, the opposite end of the cylinder 257 is on exhaust through the duct 255, ports in the sleeve 215 of valve 210, and the ducts 287 and 288 which lead to the sump of the machine. Thus, pressure is applied to the piston 256 to hold the sliding base in operative or cutting position.

At this same time, the pressure fluid flowing from the duct 285 enters the duct 289 and flows through the duct 290, ports in the sleeve 216 of valve 211, and the duct 271 into one end of the cylinder 106 to hold the piston 105 in the position shown in Fig. 8 with the loader 100 in the position shown in Fig. 9. At this time, the opposite end of the cylinder 106 is on exhaust through the duct 270, ports in the sleeve 216 of valve 211, the duct 292, and the duct 293 which connects with the ducts 298 and 288 that lead back to the sump.

At this time, also, the stripper member 160 (Figs. 1, 6, and 7) is in inoperative position, the piston 170 being held in the position shown in Fig. 27 by the pressure fluid flowing from the pressure duct 289 through the duct 294, ports in the sleeve 217 of valve 212, and the ducts 276 and 278. The left hand end of the cylinder 170 is at this time on exhaust through the ducts 277 and 275, ports in the sleeve 217 of valve 212, and the duct 295 which connects with the ducts 298 and 288 that lead back to the sump of the machine.

At this time, also, the button or stop 136 (Fig. 5) is in operative position holding the lowermost blank in the channel 98 from dropping down, the pressure fluid flowing from the duct 276 through the duct 284 into one end of the cylinder 146 and the motive fluid exhausting from the opposite end of this cylinder through the duct 283 into the duct 275.

At this time, also, the rear end of the cylinder 76 (Figs. 2 and 27) is on exhaust through the duct 78, ports in the sleeve 218 of valve 213, and the duct 296 which connects with the exhaust ducts 298 and 288. Thus, the work is held chucked by action of the spring 60.

At this time, also, the piston 190 is held at the left hand end of its cylinder 191, causing the crank member 83 (Fig. 12) to hold the loading unit in inoperative position. The pressure fluid flows from the duct 289 through ports in the sleeve 219 of valve 214 and duct 281 into the right hand end of cylinder 191, while the left hand end of this cylinder is on exhaust through the duct 280, ports in the sleeve 219 of valve 214, and the exhaust ducts 297, 298, and 288.

The several control cams 220, 221, 222, 223, 224, and 250 are shown in Figs. 15 to 20 inclusive and layouts of the operative surfaces of these cams are shown in Fig. 14. The diagram of Fig. 14 is lined off in graduations of 20°. The zero point on the diagram corresponds to the positions of the key slots in the cams. At the zero point, the sliding base 35 is in operative position and the loading unit is in inoperative position.

When the motor 227 is started, the control cams start to revolve. The nose of lever 230 (Fig. 11) then rides up on the lobe 300 of cam 220 causing the valve 210 to be shifted from the position shown in Figs. 11 and 27 against the resistance of the spring 240. This causes the duct 255 to be put on supply from the duct 286 and the duct 265 to be put on exhaust through the ducts 302 and 288. The piston 256 is therefore moved to the left from the position shown in Fig. 27, causing the sliding base 35 to be withdrawn from operative to loading position. As the sliding base makes this movement, the head 259 of the piston-rod 258 is disengaged from the limit switch 260, allowing this limit switch to open.

Figure 11:
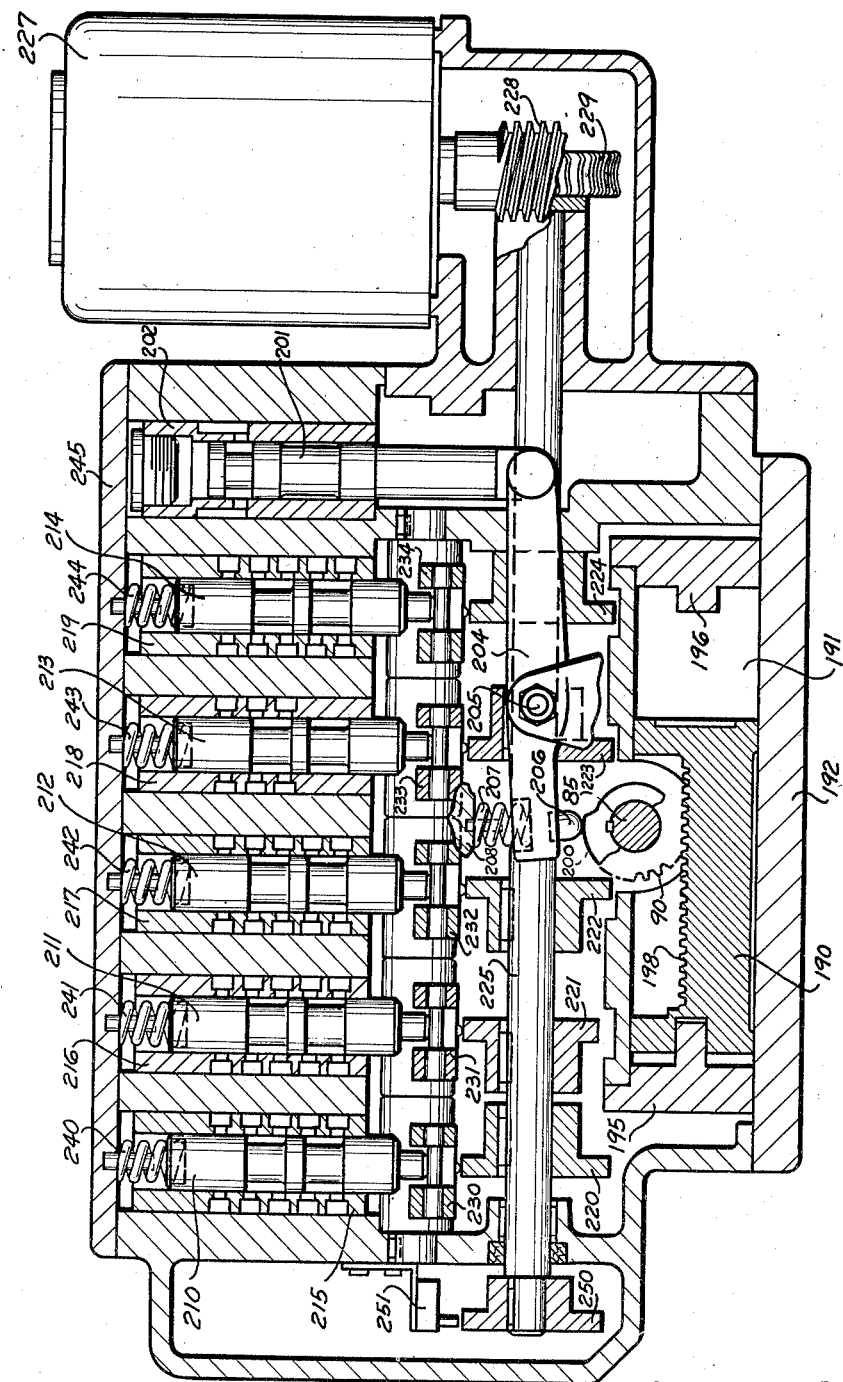
Fig. 11 is a longitudinal sectional view through the loading unit showing particularly the cams and valves which govern the operation of the loading mechanism.

As the shaft 225 continues to revolve, the nose of lever 234 (Fig. 11) rides up on the lobe 303 of the cam 224, causing the valve 214 to be shifted upwardly from the position shown in Figs. 11 and 27 against the resistance of the spring 244. This puts the duct 280 on supply from the duct 289 and the duct 281 on exhaust through the ducts 304 and 298. The piston 190 is therefrom moved to the right from the position shown in Fig. 27, causing the rack 198 to revolve the pinion 99 and shaft 85 to rotate the cam 200 and crank member 83. The rotation of the crank member 83 causes the loading unit 80 to be swung down from its inoperative to its operative position. The rotation of the cam 200 causes the lever 204 to rock about its pivot 205 to move the valve 201 upwardly. This shuts off the connection between the ducts 265 and 266, holding the sliding base in withdrawn or loading position. The valve 201 acts as a safety interlock between the sliding base and the loading unit, preventing return of the sliding base to operative position until the loading unit is in its upper or inoperative position.

In the further rotation of the shaft 225, the nose of the lever 233 (Fig. 11) rides up on the lobe 305 of the cam 223. This shifts the valve 213 upwardly against the resistance of the spring 243 and the line 78 is put on pressure from the duct 299. This causes the draw-bar 53 to be forced forwardly in the work spindle against the resistance of the spring 76 to dechuck the work.

In the further rotation of the shaft 225, the nose of the lever 232 (Fig. 11) rides up on the lobe 306 of the cam 222 (Figs. 14 and 18). This causes the valve 212 to be moved upwardly against the resistance of the spring 242. This puts the duct 275 on supply from the duct 294 and the duct 276 on exhaust through the ducts 308, 309, 298, and 268. This causes the pistons 170 and 145 to be moved to the right from the positions shown in Fig. 27. The movement of the piston 170 causes the stripper 160, which has been engaged over the work arbor in the lowering of the loading unit, to move forward axially on the arbor and strip the completed, dechucked gear from the work spindle. The movement of the piston 145 causes the stop button 136 (Fig. 5) to be rotated out of operative position and the stop button 135 to be moved into operative position. This releases the lowermost blank B', which is in the channel 98 of the loading unit and allows that blank to drop into the loader 100, while the stop button 135 is holding the blank B'' and all of the blanks above that blank from dropping down. The position, which the blank B' has, after it has been dropped into the pocket of the loader, is shown in dotted lines in Fig. 5 at B$^a$.

In the further rotation of shaft 225, the nose of lever 232 will ride down off of the lobe 306 of cam 222, allowing the spring 242 to shift the valve 212 back to the position shown in Fig. 27. This causes the pistons 145 and 170 to be returned to the positions shown. The stripper 160 is thus moved rearwardly of the work arbor to inoperative position, and the buttons 135 and 136 are returned to the positions shown in Fig. 5. This allows the stack of blanks to drop down in the channel 98 so that they are now held by the lower stop button 136 with the blank B'' now lowermost.

In the further rotation of the shaft 225, the nose of the lever 231 rides up on the lobe 307 of the cam 221, shifting the valve 211 upwardly against the resistance of the spring 241. This puts the duct 270 on supply from the duct 290 and the duct 271 on exhaust through the ducts 310, 293, 296, and 288. This causes the loader 100 (Figs. 5, 9, and 10) to push the new gear blank B' over the now-collapsed jaws 48 of the collet member 47 (Fig. 4).

In the further rotation of the shaft 225, the nose of the lever 233 drops off of the lobe 305 of the cam 223, allowing the spring 243 to return the valve 213 to the position shown in Figs. 11 and 27. This puts the duct 78 on exhaust again through duct 299 and allows the spring 60 to move the draw-bar 53 rearwardly in the work spindle 43 (Fig. 4) to chuck the new gear blank B' that has just been loaded on the work arbor.

As the shaft 225 rotates still further, the nose of the lever 231 drops off of the lobe 307 of cam 221, allowing the spring 241 to return the valve 211 to the position shown in Figs. 11 and 27. This puts duct 270 on exhaust and duct 271 on supply and causes the loader 100 to be returned to the position shown in Fig. 9. As the loader moves back to this position, the clamping jaws 120 and 121 ride over the newly chucked blank opening sufficiently against the resistance of the spring 124 and 125 to release the now-chucked blank, but they are held from collapsing too far during the return movement of the loader by the block 129. When the loader has been returned to the position shown in Fig. 9, the tail portions of the jaws engage the post 128 and the jaws are spread open again. The loader is now in the position shown in Fig. 9 but without a blank in it. It does not receive a new blank, until in the next operation of the loading mechanism, button 136 is rotated to allow the now lowermost blank B'' in the stack to drop into the pocket of the loader.

As the shaft 225 rotates still further, the nose of lever 234 drops off the lobe 303 of cam 224, allowing the spring 244 to return the valve 214 to the position shown in Figs. 11 and 27. This puts duct 281 back on supply and duct 280 back on exhaust, causing the piston 190 to be moved back to the left to the position shown in Fig. 27. This revolves the shaft 85. The crank member 83 (Fig. 12) is thus rotated to move the loading unit 80 upwardly from operative to inoperative position. The cam 200 is also rotated to rock the lever 204 back to the position shown in Figs. 11 and 27, causing the valve 201 to be returned to the position shown in those figures. This permits the ducts 265 and 266 to be connected again.

In the further rotation of the shaft 225, the nose of lever 230 rides down off of the lobe portion 300 of the cam 220, allowing the spring 240 to return the valve 210 to the position shown in Figs. 11 and 27. This causes the duct 266 to be put on supply again from ducts 286 and 265 and the duct 255 to be put on exhaust again through ducts 287 and 288. This causes the sliding base 35 to be returned to operative position. As it returns, the head 259 of the piston-rod 258 releases the limit switch 261 to allow that switch to open, and, when the sliding base has reached operative position, the head 259 engages and closes the limit switch 260. This restarts the main drive motor 315 of the machine.

When the sliding base reaches operative position, the shaft 225 will have rotated far enough for the lobe 311 of cam 259 to engage and trip the limit switch 251 (Fig. 11). This stops the loading unit motor 227 and the shaft 225. The loading cycle is now completed, and with the feed motor 315 restarted the machine starts a new cutting cycle on the newly chucked gear blank.

One way in which the machine may be wired electrically to perform its functions is illustrated diagrammatically in Fig. 28.

There are two controllers provided, one, 316, for the main drive motor 315, and the other, 317, for the loading unit motor 227. These controllers may be of standard or suitable construction. There are three relays provided. These are denoted at 318, 319, and 320, respectively. They may be of any standard or suitable construction.

In addition, there are the six limit switches 39, 134, 251, 260, 261, and 355 of standard construction provided. The first five of these have already been mentioned. The sixth, 355, is part of the automatic stop mechanism of the machine (not shown). This mechanism may be of conventional construction. The switch 355 is a normally closed switch, but when all of the teeth of a gear have been cut, the automatic stop mechanism is tripped, opening limit switch 355 momentarily. The parts are shown in Fig. 28 in the positions which they occupy when the machine is idle, and the sliding base 35 is in its withdrawn, inoperative position, and the loading unit is in its upper, inoperative position.

The double-pole limit switch 260 (Figs. 1, 27, and 28) is in the starting circuit of the main drive motor 315 and to start this motor it is necessary to move the sliding base 35 to operative position to close this switch. In the type of machine shown in the drawings, the movement of the sliding base to operative position is accomplished initially by manual movement of a lever 380 (Fig. 12) to which further reference will be made later. When the sliding base is in operative position, the limit switch 260 is closed and the operator can start the motor 315 by pressing in the main motor starter button 325. This makes a circuit to the coil 333 of relay 318 from the main line $L_1$ through the line 327, a normally-closed button 328 used for resetting the loading unit, the line 329, the main motor stop button 330, the line 331, the main motor starter button 325, the line 332, the coil 333, and the lines 347 and 338 to the main line $L_2$. This energizes the coil 333, causing the switch arm 340 of relay 318 to be closed. This closes a circuit to the coil 326 of controller 316 from main line $L_1$ through line 327, button 328, line 329, stop button 330, lines 331, and 341, now-closed switch arm 340, line 342, already-closed switch arm 343 of relay 320, line 344, already-closed switch arm 345 of relay 319, line 346, coil 326, line 334, pole 335 of limit switch 260, and lines 336, 337, and 338 to main line $L_2$. This energizes the coil 326 and causes the switch arms 350, 351, and 352 of controller 316 to be closed starting the main motor 315.

The machine now goes through its cutting cycle with the rotating cutter being fed back and forth across the face of the blank and the blank being indexed each time the gap in the cutter is abreast of the blank. When all of the tooth spaces of the work have been cut, the automatic stop mechanism of the machine is tripped, opening the limit switch 355. This breaks the circuit to the coil 356 of the relay 319, allowing the switch arms 357 and 345 of that relay to drop out of engagement. When the switch arm 345 drops out, the circuit to the coil 326 of the controller 316 is broken and the main motor 315 is stopped.

The opening of the limit switch 355 also breaks the circuit to the coil 359 of relay 320, causing the switch arms 360 and 343 of that relay to drop out of engagement, and causing the switch arm 361 of that relay to connect lines 362 and 363.

The limit switch 39 is closed by cam 37 on each revolution of the cutter C during cutting, but nothing happens. After the last tooth of a blank has been cut, however, and the automatic stop switch 355 has been opened, if the main motor 315 stops with the cutter in the correct position, that is, with the gap in the cutter abreast of the blank, then the cam 37 (Fig. 1) in closing limit switch 39 causes a circuit to be made to the coil 365 of the controller 317. This circuit is from the main line $L_1$ through the line 327, button 328, line 329, stop button 330, lines 331 and 341, switch arm 340 of relay 318, lines 342 and 362, switch arm 361 of relay 320, line 363, now-closed limit switch 39, line 366, coil 365, line 367, pole 368 of limit switch 260, and lines 337 and 338 to main line $L_2$. This will cause the coil 365 to be energized, pulling in the switch arms 368, 369, and 370 of controller 317. This starts the motor 227, and the shaft 225 (Fig. 11) starts to revolve.

As this shaft revolves, as described above, the first thing that takes place is that the nose of the lever 230 rides up on the lobe 300 (Figs. 14 and 15) of cam 220. This causes the valve 210 to be moved upwardly from the position shown in Figs. 11 and 27 with the result that fluid-pressure is applied to the piston 256 in such way as to move the sliding base 35 outwardly from operative to loading position. As the sliding base moves outwardly, the head 259 (Figs. 1 and 27) of piston-rod 258 is moved away from the limit switch 260. Since this limit switch is a normally-open limit switch, both poles 335 and 368 of this switch then open.

This breaks the circuit to the coil 365 of controller 317 and stops the loading unit motor 227. The fluid pressure system of the machine is so arranged, however, that the pressure fluid is supplied all the time that the machine is in operation. Therefore the pressure fluid continues to flow to the cylinder 257 so that, despite the stoppage of motor 227, the sliding base continues to move on out to loading position. When the sliding base reaches loading position, the head 259 of piston-rod 258 (Figs. 1 and 27) engages and closes limit switch 261. This remakes the circuit to the coil 365 of controller 317 from the main line $L_1$ through the line 327, button 328, line 329, stop button 330, lines 331 and 341, switch arm 340 of relay 318, lines 342 and 362, switch arm 361, line 363, now-closed limit switch 39, line 366, coil 365, line 367, limit switch 261, and lines 372, 337, and 338 to main line $L_2$. This causes the unit motor 227 to be restarted. The shaft 225 (Fig. 11) starts, therefore, to rotate again.

As the shaft 225 (Fig. 11) rotates under actuation of motor 227, the loading unit 80 is swung down to operative position, the work is de-chucked, the stripper is actuated to strip the completed gear from the work arbor, a new blank is dropped into the loader, and the loader 100 is moved to load the blank on the work arbor, all as already described. When the loader has been moved to loading position, the gear 115 (Fig. 7) will have rotated far enough for the pin 118, which is carried by this gear, to engage the plunger 119 and close the limit switch 134.

The opening of the limit switch 355 is momentary as already stated and this switch closes again immediately after opening. When the limit switch 134 is closed, then, a circuit is remade to the coil 356 of relay 319 from the main line $L_1$ through the line 327, button 328, line 374, limit switch 355, line 379, limit switch 134, line 383, coil 356, and lines 378 and 338 to main line $L_2$. This causes the coil 356 to be energized and the switch arms 357 and 345 of relay 319 are again pulled in.

When the loader moves back to original position again, on further rotation of shaft 225, pin 118 moves away from plunger 119 and limit switch 134, which is a normally open limit switch, opens. The circuit to coil 356 is maintained however, from main line L₁ through line 327, button 328, line 374, limit switch 355, lines 375, 376, and 393, switch arm 357 of relay 319, line 377, coil 356 and lines 378 and 338 to main line L₂.

When the shaft 225 has rotated far enough for the nose of lever 230 to ride down off the lobe of cam 220, the valve 210 is shifted back to the position shown in Figs. 11 and 27 and the sliding base 35 returns to operative position. As soon as the return movement begins, the head 259 of piston-rod 258 (Figs. 1 and 27) moves away from limit switch 261 and this limit switch opens. This breaks the circuit to the coil 365 of relay 317, stopping the unit motor 227, but the sliding base continues to move on in to operative position.

As soon as the sliding base reaches operative position, it closes the double-pole limit switch 260 and the circuit to the coil 365 is made again, restarting the unit motor 227. This causes the shaft 225 to be driven on the slight distance required for the lobe 311 of cam 250 (Figs. 11 and 20) to engage and close the normally-open limit switch 251.

This completes a circuit to the coil 359 of relay 329. This circuit is from main line L₁ through line 327, button 328, line 374, limit switch 355, line 375, limit switch 251, line 394, coil 359, and line 338 to main line L₂. This causes the switch arms 360 and 343 of relay 329 to be closed and switch arm 361 of this relay to be moved to the position shown in Fig. 28 breaking the connection between lines 362 and 363. This breaks the circuit to the coil 365 of controller 317, stopping the unit motor 227 again. The loading cycle is finished.

The shaft 225 will coast a little bit after the circuit to coil 365 is broken and the plunger of limit switch 251 will ride down off of the lobe 311 of the cam 250, and this limit switch will reopen, as shown in Fig. 28. The circuit to coil 359 is maintained, however, from main line L₁ through line 327, button 328, line 374, limit switch 355, lines 375, 376, and 393, switch arm 360 of relay 329, line 395, coil 359, and line 338 to main line L₂.

When the sliding base reaches operative position, closing the limit switch 260, the circuit to the coil 326 of controller 316, therefore, is remade. This restarts the feed motor 315, starting a new cutting cycle to cut the newly chucked gear blank.

Figure 12:
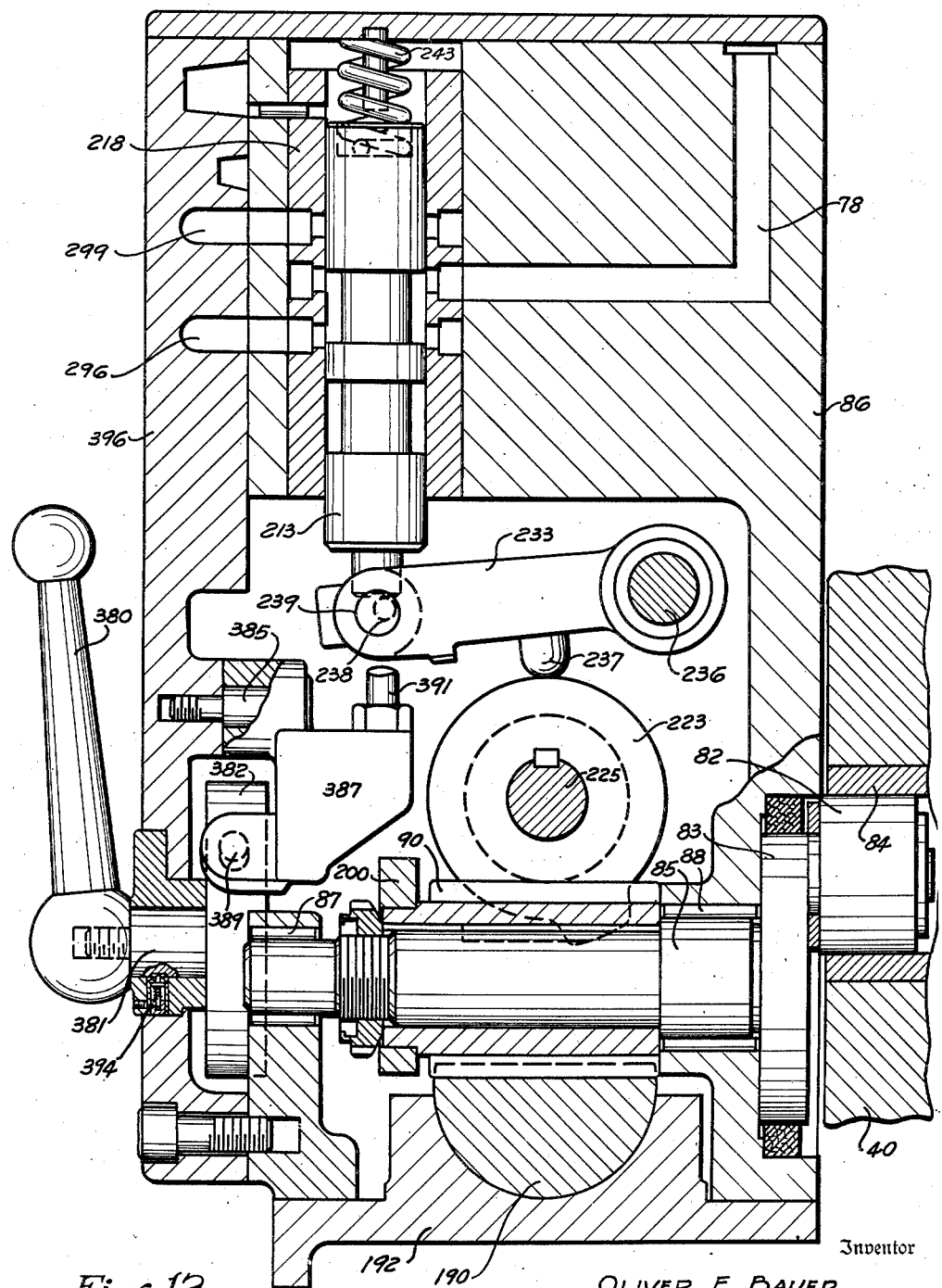
Fig. 12 is a sectional view taken at right angles to the view of Fig. 11, and on a somewhat enlarged scale.
Figure 13:
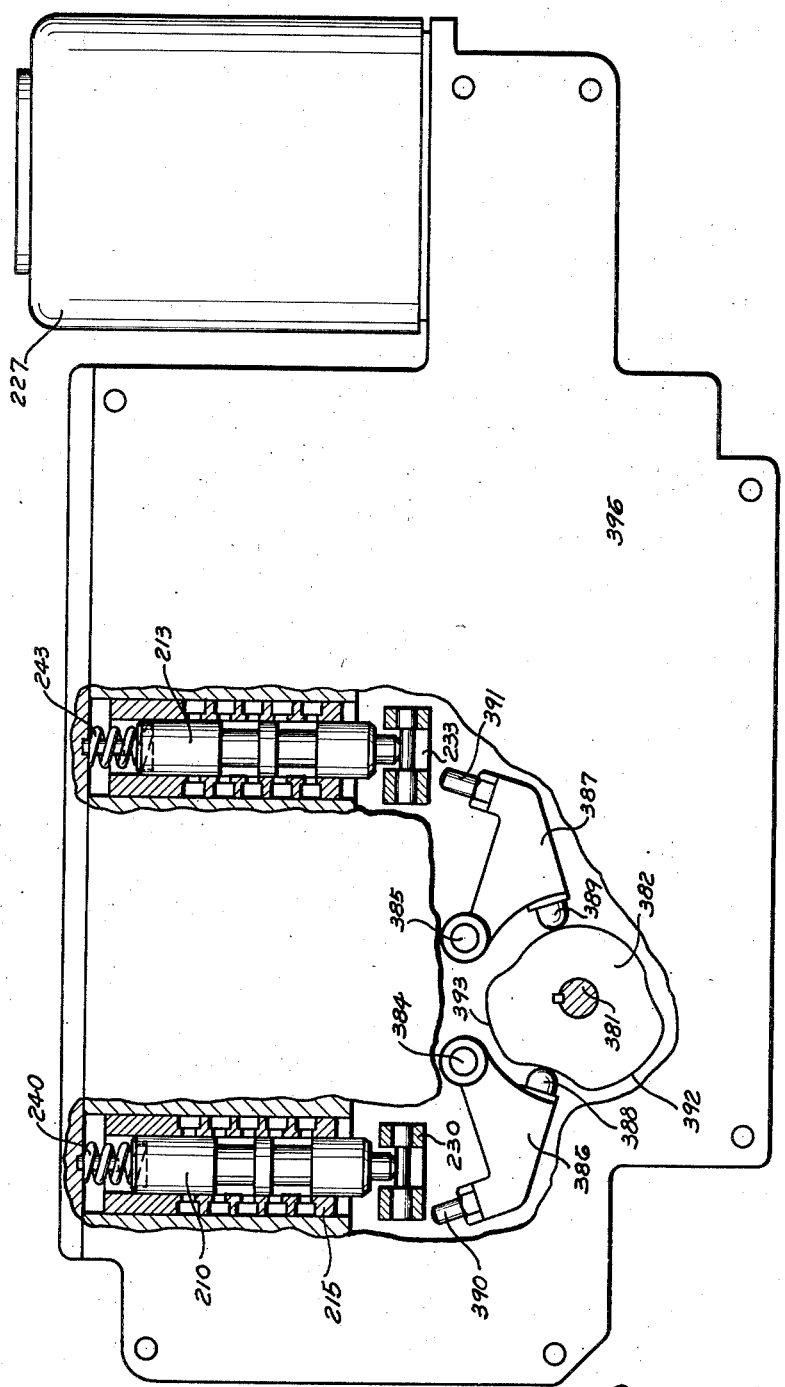
Fig. 13 is an elevational view looking at one side of the control unit and with parts broken away to show the means for manually operating the chuck and sliding base of the machine.

For setting up the machine, manual controls are provided to control the movement of the sliding base and the chucking mechanism. These controls are operable by the lever 380 (Fig. 12) which is secured to the outer end of a stub-shaft 381, that is journaled in the side-plate 396 which is secured to casting 86. To the inner end of this stub-shaft is keyed a cam 382 (Figs. 12 and 13). Pivotally mounted on pins 384 and 385, respectively, which thread into the cover-plate 396, are two levers 386 and 387. These levers have hardened followers 388 and 389, respectively, secured in them which engage at opposite sides with the periphery of the cam 382. The levers also have pins 390 and 391, respectively, secured in them which are adapted to engage the levers 230 and 233, respectively.

The cam 382 is of the shape shown clearly in Fig. 13. When the lever 380 is moved to rotate this cam in a clockwise direction, the follower 388 rides up onto the lobe portion 392 of the cam and the lever 386 is moved upwardly. This causes pin 390 to engage the lever 230 and move that lever and valve 210 upwardly. This causes fluid-pressure to be applied to the piston 256 (Fig. 27) in such direction as to move the sliding base 35 from operative to loading position. If the operator continues to rotate the cam 382 in the clockwise direction, the follower 389 will ride up on the lobe 393 of the cam, causing the pin 391 to move lever 233 and valve 213 upwardly against the resistance of the spring 243. This puts the line 78 (Fig. 27) on supply and moves the draw-rod 53 forward in the work spindle to dechuck the blank. Reversal of the direction of movement of the lever 380 will cause followers 389 and 388 to ride down off lobes 393 and 392, respectively, and the draw bar 53 to be moved to chucking position again and the sliding base to be returned to operative position. A spring-pressed detent 394 (Fig. 12), which engages selectively in one of two notches in the shaft 381, serves to hold the lever 380 at one or the other limit of its movement. By manipulating lever 380, then, the operator can move the sliding base 35 back and forth and chuck and dechuck the work readily to permit of easily setting up the machine for cutting.

The chute 95 (Figs. 1 and 23) will hold quite a number of gear blanks and when this chute is once filled, the machine will run a considerable length of time without further attention of the operator before all of the blanks are cut. If it is desired that the machine run for a still longer period of time and cut a greater number of blanks than can be held in the chute 95 before reloading, then some form of hopper or magazine may be used to supply blanks to the chute.

A preferred type of magazine constructed according to the invention is shown in the drawings. This magazine is in the form of a rotary member 400 of truncated conical shape (Figs. 1, 23, and 24). The magazine is rotatably journaled on cylindrical bar 401 which is secured at opposite ends in the legs of a U-shaped bracket 402 which is fastened to or integral with an upright stand or support 403 (Figs. 2 and 23). This stand 403 is fastened by bolts 404 to the sliding base 35 of the machine.

The magazine is provided with a plurality of radially disposed blank-holding slots or grooves 405. Each slot 405 has parallel side walls lying in planes extending in the direction of the axis of the rotation of the magazine, and each of the slots has a bottom wall 406 inclined to the axis of rotation of the magazine and sloping from the back end of the magazine to the front end thereof. The top wall of each slot may be parallel to the bottom wall. Each slot 405 is of sufficient length to hold a plurality of gear blanks and the dimensions of the slots are such that the blanks will roll freely in the slots without canting.

The magazine 400 is adapted to be indexed about its axis step-by-step with each movement of the loading mechanism from inoperative to loading position. For the purpose of indexing the magazine, a pawl 410 is pivotally mounted in the end plate 396 of the casting 86. This pawl 410 is adapted to engage with ratchet teeth 407 formed on the periphery of the magazine, the periphery of the magazine being shaped at its inner end as illustrated in dotted lines in Fig. 24 to provide a number of ratchet teeth 407 corresponding in number with the number of slots or grooves 405 in the magazine. The pawl 410 is constantly urged into engagement with the teeth 407 by a spring-pressed plunger 412 which is housed in a keeper 413 that is secured to the plate 396.

As is clearly shown in Fig. 2, when the loading unit 80 is moved from its operative (full line) position to its inoperative (dotted line) position, the pawl ratchets upwardly over the teeth 407 of the magazine, but when the loading unit is moved from inoperative, dotted-line position to operative, full-line position, the pawl engages one of the teeth 407 and rotates the magazine, indexing it. The pawl is so arranged that on each movement of the loading unit from inoperative to operative position it moves the magazine angularly a distance equal to the distance between successive slots or grooves 405 so that each time that the loading unit is lowered, a new slot of the magazine will be brought into registry with open outer end of the chute 95.

The chute 95 is so positioned that a slot 405 of magazine 400 does not register with the open end of the chute until the slot has been indexed to its uppermost position. When the slot is in uppermost position, however, the blanks in the slot tend to roll into the chute because of the inclination of the bottom wall of the slot, as already shown in Fig. 23. Thus when each slot of the magazine is in its uppermost position, the supply of blanks in the chute 95 is replenished from the supply of blanks in the slot.

Before starting the machine on a particular job, the operator fills the chute 95 with blanks. Hence each time that a slot in the magazine registers with the chute, only one blank will be discharged from the slot into the chute, for one blank will replenish the chute. To prevent wedging of the blanks between the magazine and the chute when the loading unit is swung up to inoperative position after a loading operation or when the magazine is being indexed, the outer ends of the side walls of the chute are beveled as indicated at 414 (Fig. 25). Hence, as the loading unit moves relative to the magazine, in either direction, the bevel will force the blank back into the slot in the magazine from which it protrudes.

The inner leg 416 of the U-shaped bracket 402 is of approximately circular shape and is of such dimensions as to completely cover and close the front ends of all the slots in the magazine except one. The leg 416 has a slot in it which aligns with that slot 405 of the magazine which at any time happens to be in the top position. This slot in leg 416 is to permit blanks to roll from the uppermost slot in the magazine into the chute 95. To prevent the blanks from rolling out of the topmost slot 405 after the chute has been moved out of registry with the slot by upward movement of the loading unit, there is a tail piece 415 (Fig. 26) secured to the chute in position to cover the inner end of the slot 405.

The rear leg 417 (Fig. 23) of the U-shaped bracket 402 is of approximately circular shape and is of such dimensions as to completely cover and close the rear ends of all the slots 405 in the magazine, except one. It has a slot 418 in it which aligns with whichever slot 405 of the magazine happens to be uppermost. Blanks can be loaded into the magazine through slot 418 of the cover plate 417.

To insure that the blanks are put into the magazine by the operator in correct position for proper loading on the work spindle, there is a positioning member 420 (Fig. 23) secured to the bracket 402 to register with the uppermost slot in the magazine and with slot 418. This positioning member has an opening through which the blanks may be passed and it has three pins 421 (Figs. 23 and 24) projecting into its opening which are so placed that an incorrectly positioned blank cannot pass through them.

The machine may be used for cutting either gears from the solid or for finish-cutting previously toothed gear blanks. Where the blanks have been previously toothed, as by a rough-cutting operation, it is necessary to provide some means to divide stock so that a tooth space of the blank may be in registry with the cutter when chucked. For this purpose, two stock dividing pins 425 may be mounted in the pocket of the transfer member 100 (Figs. 21 and 22). These pins are positioned a distance apart determined by the pitch of the gear to be cut so that when a gear blank drops into the pocket 99 of the loader, the pins 425 will enter two different tooth spaces of the gear blank and rotate the gear blank into correct position to align a tooth space of the blank with the cutter. A third pin 426 may be mounted in the channel 98 of the loading unit. This pin 426 is positioned at a distance from stop button 136 such that the pin will engage a tooth of the bottommost gear blank in the channel as that blank drops down out of the slot into the pocket of the loader 100, and rotate the blank to bring its tooth spaces into proper position to enter between the two stock-dividing pins 425.

Each of the pins 425 and 426 is rotatable and is mounted eccentrically of its journal portion. By rotatably adjusting any one of the pins 425, therefore, its distance from the other pin 425 can be adjusted, or when the pin 426 is rotated, its distance from the stop button 136 can be adjusted.

The clamping jaws 120' and 121' (Fig. 22) for holding the previously toothed gear blanks T in the loader 100 are slightly different in shape from the clamping jaws for holding the untoothed blanks B but again are of a conformation to suit the conformation of the work.

*Summary of operation*

The operation of the gear cutting machine and loading mechanism will be understood from the preceding description but may be summed up briefly here.

Assuming that all of the necessary adjustments have been made, that a gear blank has been chucked on the work spindle, and sufficient blanks have been loaded into the loading unit and into the magazine, the operator rocks lever 380 (Fig. 12) to shift valve 213 (Figs. 12 and 27) to cause piston 256 to move sliding base 35 (Fig. 1) into operative position. When the sliding base reaches operative position, limit switch 260 is closed. The operator then starts the main drive motor 315 (Fig. 28) by pressing in starter button 325. The machine then goes through its cutting cycle, the cutter C being rotated and being fed back and forth across the face of the blank by reciprocation of slide 34 (Fig. 1) and the blank being indexed each time the gap in the cutter is abreast of the blank.

When all of the teeth of the blank have been cut, the automatic stop mechanism of the machine trips, momentarily opening normally closed limit switch 355 (Fig. 28). This breaks the circuit to the main drive motor 315 and starts the loader unit motor 227. Shaft 225 (Fig. 11) then starts to rotate. Cam 220 then shifts valve 210 (Fig. 27) causing piston 256 to withdraw sliding base 35 from operative to loading position. As the withdrawal movement starts, limit switch 260

(Figs. 1, 27, and 28) opens, stopping motor 227, but when the sliding base reaches loading position, limit switch 261 is closed and motor 227 is restarted. Cam 224 then shifts valve 214 to cause piston 190 (Figs. 11, 12, and 27) to rotate crank member 83 and swing the loading unit 80 down to operative position. In this movement, pawl 410 (Figs. 2 and 24) rotates the magazine 400 so that a new slot 405 in the magazine comes into alignment with the chute 95 so that a blank may roll from the magazine into the chute when a blank subsequently drops out of channel 98 (Fig. 23) into the loader 100. In the downward movement of the loading unit, the stripper 160 (Figs. 1, 3, and 7) also engages behind the completed gear on the work arbor. In this movement, also, piston 190 rotates cam 200 (Figs. 11 and 27) causing valve 201 to be shifted to block off duct 266, preventing any movement of sliding base 35 as long as the loading unit is in its down position.

Shaft 225 rotates on and next cam 223 shifts valve 213 to cause piston 75 (Figs. 4 and 27) to move draw-rod 50 forwardly in the work spindle and dechuck now-completed gear G. Then cam 222 shifts valve 212 to cause piston 170 to move stripper 160 forward axially of the work spindle and strip the dechucked gear G from the work arbor, and to cause piston 145 to rotate shafts 130 and 140 (Fig. 5) through interconnecting segments 138 and 141. Thus, stop button 136 is moved out of the way to release lowermost gear blank B' and allow this blank to drop from channel 98 into pocket 99 of loader 100, while stop button 135 is moved into position to hold gear blank B'' and the other blanks in the channel and chute from following blank B' down. As shaft 225 rotates further on, cam 222 allows valve 212 to be reversed, causing piston 170 to move stripper 160 back to its "clear" position, and causing piston 145 to reverse stop buttons 135 and 136, allowing blank B'' to drop on down in channel 98 as far as allowed by stop 136. This makes room for a blank and a blank rolls out of the uppermost slot 405 in magazine 400 into chute 96. Then cam 221 shifts valve 211 to cause piston 105 to move loader 100 (Figs. 9 and 10) toward the work spindle and shove the blank B' over collapsed collet jaws 48 (Fig. 4). During this operation, gear 116 (Figs. 7 and 8) is rotated far enough by movement of piston 105 for pin 118 to close limit switch 134 (Figs. 7 and 28) resetting relay 319 which is in the starting circuit of main drive motor 315.

In the further rotation of shaft 225, cam 223 reaches a position where valve 213 puts piston 75 on exhaust, and so the new workpiece B' is chucked. Then cam 221 allows valve 211 to be reversed and the loader 100 is moved away from the work spindle back to initial position. Then cam 224 allows valve 214 to be reversed and piston 190 rocks crank plate 83 (Fig. 11) causing the loading unit to be swung up to inoperative position. In this movement, pawl 410 (Figs. 2 and 24) ratchets idly over the teeth 407 of magazine 400, and is reset. In the latter part of its movement, piston 190 rotates cam 200 (Fig. 27) far enough to open valve 201 again permitting movement of piston 256. Then cam 220 allows valve 210 to be reversed and piston 256 moves the sliding base 35 back to operative position, carrying the newly-chucked blank B' into position for cutting. At the beginning of this movement, limit switch 261 opens, stopping motor 227, but at the end of the movement limit switch 260 is closed. This restarts loading unit motor 227 and also restarts main drive motor 315. Thus a new cutting cycle is begun. Motor 227 drives shaft 225 on only far enough for cam 250 to open limit switch 251 stopping this motor, and ending the loading cycle. A cycle of operation of the machine is completed.

So the machine operation proceeds, a blank is cut; the main drive motor is stopped, the loading unit motor is started; the sliding base is withdrawn to loading position; the loading unit is swung down to loading position, rotating the magazine a step; the work is dechucked; the completed gear is stripped from the work arbor and a new blank is dropped into the loader; the stripper is returned to initial position; the blanks in the loading unit drop down in the unit and a blank rolls out of the magazine into the chute of the unit; the loader is actuated to push the blank, which is in its pocket, onto the work arbor; the new blank is chucked; the loader is withdrawn leaving the blank on the work arbor; the loading unit is swung up to inoperative position; the sliding base is returned to operative position; the main drive motor is started again; and the loading unit motor is stopped. In each loading cycle, the magazine is rotated a step and one blank rolls out of the slot in the magazine, which then happens to be uppermost, into the chute of the loading unit. The machine will continue in operation, therefore, until all of the blanks in the loading unit and magazine have been cut. It is only then that the operator needs to reload the loading unit and magazine.

While the invention has been described in connection with a machine for cutting gears and particularly in connection with a machine for cutting straight bevel gears, it will be understood that the loading mechanism of this invention may be applied to any type of machine for the production of gears, including machines for cutting, grinding, testing, lapping, burnishing, and shaving gears. Moreover, it will be understood that the invention may be used in the production of various types of gears and with various types of tools. Still further, it will be understood that while the invention has been described in connection with the production of gears, it may be used with suitable modification for loading workpieces of all sorts on machines on which work on those workpieces is to be performed. It will further be understood that while the invention has been described in connection with particular embodiments thereof, it is capable of further modification and this application is intended to cover any variations, uses, or adaptations of the invention following, in general, the principles of the invention and including such departures from the present disclosure, as come within known or customary practice in the gear art, as may be applied to the essential features hereinbefore set forth, and as fall within the scope of the invention or the limits of the appended claims.

Having thus described our invention, what we claim is:

1. In a machine tool, a work support, a loading unit movably mounted on the work support and adapted to hold a plurality of workpieces, means for moving the loading unit from inoperative position to operative position, a stripper movably mounted on the loading unit and so positioned thereon that, when the loading unit is moved to operative position, the stripper will thereby be positioned behind a blank carried by the work support, a transfer member movably mounted on the loading unit, means for actuating the stripper, after the loading unit is in operative position, to strip a workpiece from the work support, and means for thereafter actuating the transfer member to transfer a new workpiece from the loading unit to the work support.

2. In a machine tool, a work support, a work spindle journaled in the work support, a loading unit movably mounted on the work support for movement from inoperative to operative position and back, said loading unit being adapted to hold a plurality of workpieces, a transfer member reciprocable rectilinearly on the loading unit and so arranged thereon that, when the loading unit is in operative position, the transfer member will be aligned axially with the work spindle, means for moving the loading unit from inoperative to operative position, and means for thereafter moving the transfer member in one direction to transfer a workpiece from the loading unit to the work spindle.

3. In a machine tool, a work support, a work spindle journaled in the work support, a loading unit mounted on the work support for movement from inoperative to operative position, a magazine adapted to carry a plurality of workpieces and indexable step-by-step to supply workpieces to the loading unit, a transfer member movably mounted on the loading unit and adapted, when the loading unit is in operative position, to be actuated to transfer a workpiece from the loading unit to the work spindle, means for moving the loading unit from inoperative to operative position, means operative on such movement to index the magazine, and means for actuating the transfer member when the loading unit is in operative position.

4. In a machine tool, a work support, a work spindle journaled in the work support, a loading unit for positioning workpieces on the work spindle, a magazine mounted to rotate on a horizontal axis and having a plurality of slots therein, each of which is adapted to hold a plurality of workpieces, and each of which has its bottom inclined to the axis of rotation of the magazine whereby, when any one of the slots is in its uppermost position, the workpieces may roll from the slot into the loading unit, and means for rotating the magazine to bring its slots successively to uppermost position.

5. In a machine tool, a work support, a work spindle journaled in the work support, a loading unit for positioning workpieces on the work spindle, a magazine mounted to rotate on a horizontal axis and having a plurality of slots therein, each of which is adapted to hold a plurality of workpieces and each of which has its bottom inclined to the axis of rotation of the magazine whereby, when any of the slots is in its uppermost position, the workpieces may roll from the slot into the loading unit, means for moving the loading unit from inoperative to operative position, and means actuated on each of said movements for indexing the magazine to bring the slots of the magazine successively to uppermost position.

6. In a machine tool, a work support, a loading unit adapted to hold a plurality of workpieces, a transfer member movably mounted on the loading unit and adapted to be actuated to transfer a workpiece from the loading unit to the work support, said loading unit having a channel therein through which workpieces may roll from the loading unit into the transfer member, a pair of spaced stops mounted in the loading unit, means connecting said stops so that when one is moved into operative position the other is moved therefrom, one of the stops being arranged so that, when it is in operative position, it will engage the lowermost blank in the channel and prevent that blank from dropping into the transfer member, and the other stop being so arranged as to engage the blank next above so as to prevent that blank from dropping down when the lowermost blank is allowed to drop into the transfer member by movement of the first stop to inoperative position, means for moving the stops, and means for moving the transfer member.

7. In a machine tool, a rotatable work support, a loading unit, a transfer member mounted on the loading unit for rectilinear reciprocating movement thereon, said loading unit having a channel therein through which workpieces may be supplied to the transfer member and said transfer member having a pocket therein to receive a workpiece, said transfer member being normally positioned with its pocket beneath the channel in position to receive a workpiece, means for preventing workpieces from dropping out of the channel into the transfer member, means for periodically releasing said last named means, means for moving the transfer member into axial alignment with the work support, and means for thereafter moving the transfer member to load a workpiece on the work support.

8. In a machine tool, a work support, a loading unit adapted to hold the plurality of workpieces, a transfer member for transferring a workpiece from the loading unit to the work support, said transfer member having a pocket therein, a pair of clamping jaws mounted in opposite side walls of the pocket to hold a workpiece in the pocket during movement of the transfer member, means for resiliently pressing the clamping jaws to clamping position, means for actuating the transfer member to effect its movement in such wise as to load a workpiece on the work support and then return the transfer member to initial position, means for limiting the movement of the clamping jaws toward one another after the transfer member has left the workpiece on the work support and while the transfer member is being returned to its initial position, and means secured to the loading unit in position to engage the clamping jaws, when the transfer member has returned to initial position, to open the clamping jaws again ready to receive a new workpiece.

9. In a machine for operating on previously toothed gears, a work support, a tool support, tool mechanism mounted on the tool support, a loading unit adapted to hold a plurality of gear blanks, a movable transfer member for transferring a gear blank from the loading unit to the work support, said loading unit having a channel therethrough through which blanks may drop into the transfer member, a stop for preventing the lowermost blank in the channel from dropping into the transfer member, a pin associated with said stop and so arranged relative thereto that when said stop is released the lowermost blank will roll on the pin as it drops into the transfer member, and means in said transfer member for engaging in the tooth spaces of the blank as it drops into the transfer member to position the teeth and the tooth spaces of the blank in proper angular position so that, when the blank is subsequently loaded on the work support its teeth and tooth spaces will have correct relation to the tool mechanism for operation thereon.

10. In a machine tool, a tool support, tool mechanism mounted thereon, a work support, a work spindle journaled in the work support, means for chucking a workpiece on the work spindle, a loading unit adapted to hold a plurality of workpieces, a movable stripper member carried by the loading unit, a transfer member movably mounted on the loading unit, means for moving the loading unit between inoperative and operative position, said stripper and transfer members being so positioned on the loading unit that, when the loading unit is moved to operative position, the stripper member is engaged behind the workpiece that is mounted on the work spindle and the transfer member is aligned axially with the work spindle, and means for controlling the sequence of operation of the various parts so that on completion of the operations on a workpiece, the loading unit is moved to operative position, the workpiece is dechucked, the stripper member is actuated to strip the dechucked workpiece from the work spindle, and the transfer member is actuated to transfer a new workpiece from the loading unit to the work spindle, and the new workpiece is chucked.

11. In a machine tool, a work support, a work spindle journaled in the work support, a loading unit pivotally mounted on the work support for swinging movement about an axis extending at right angles to the axis of the work spindle for movement from inoperative to operative position and back, said loading unit being adapted to hold a plurality of workpieces, a transfer member movably mounted on the loading unit and so positioned thereon that, when the loading unit is in its operative position, the transfer member will be aligned axially with the work spindle, an expansible collet for chucking a workpiece on the work spindle, means for actuating the various movable parts, and means for controlling their operations so that after the loading unit is swung to operative position, the chucking mechanism will be released and the transfer member actuated to transfer a new workpiece from the loading unit to the work spindle and push it over the collapsed collet, and means for thereafter expanding the collet to chuck the new workpiece.

12. In a machine tool, a work support, a work spindle journaled in the work support, a blank holder, chucking mechanism for chucking a blank on the work spindle, a movable transfer member for transferring a blank from the blank holder to the work spindle, said transfer member having clamping jaws mounted therein to engage and hold a blank during the transfer movement, said jaws being shaped to hold the blank against a seat, which is formed on the transfer member, in position to align with the work spindle and chucking mechanism so that the blank may be mounted on the work spindle by the transfer member in the transfer movement, means for resiliently urging the jaws to clamping position and operable, when a blank has been chucked on the work spindle, to permit the jaws to disengage themselves from the chucked blank as the transfer member is returned to its initial position, and means for moving the transfer member to effect the transfer movement, to actuate the chucking mechanism to chucking position, and to return the transfer member to initial position in sequence.

13. In a machine tool, a work support, a work spindle journaled in the work support, a loading unit pivotally mounted on the work support for movement between inoperative and operative positions and adapted to hold a plurality of workpieces, a stripper movably mounted on the loading unit in such position that on movement of the loading unit to operative position, the stripper is engaged behind a workpiece on the work spindle, a transfer member movably mounted on the loading unit in position to align with the work spindle when the loading unit is in operative position, movable stops for preventing blanks from falling into the transfer member, chucking mechanism for chucking a workpiece on the work spindle, means for releasing the chucking mechanism, means for actuating the various parts, and means for controlling the operation of the various parts so that the loading unit is first moved to operative position, then the chucking mechanism is released, then the stripper is actuated to strip the dechucked workpiece from the work spindle and the stops are moved to such position as to allow the lowermost blank in the loading unit to drop into the transfer member while preventing other blanks from doing so, then the transfer member is moved to transfer the workpiece, which it holds, to the work spindle, then the chucking mechanism is actuated to chuck this workpiece, then the transfer member is returned to initial position, and the loading unit is moved back to inoperative position.

14. In a machine for operating on previously toothed gears, a work support, a tool support, tool mechanism mounted on the tool support, a loading unit adapted to hold a plurality of gear blanks, a movable transfer member for transferring a gear blank from the loading unit to the work support, said loading unit having a channel therein through which blanks may drop into the transfer member, means engaging the teeth of a blank as it drops into the transfer member to rotate the blank, and means in the transfer member for engaging in tooth spaces of the blank to position the teeth and tooth spaces of the blank in proper angular position so that when the blank is subsequently loaded on the work support by movement of the transfer member the teeth and tooth spaces of the blank will have proper relation to the tool mechanism.

OLIVER F. BAUER.
ALBERT P. SCHAUSEIL.

REFERENCES CITED

The following references are of record in the file of this patent:

UNITED STATES PATENTS

| Number | Name | Date |
|---|---|---|
| 1,794,885 | Dodge | Mar. 3, 1931 |
| 1,876,372 | White | Sept. 6, 1932 |
| 1,914,347 | White et al. | June 13, 1933 |
| 2,231,747 | Bauer | Feb. 11, 1941 |
| 2,288,058 | Wildhaber et al. | June 30, 1942 |
| 2,343,407 | Galloway | Mar. 7, 1944 |
| 2,372,596 | Miller | Mar. 27, 1945 |
| 2,382,013 | King | Aug. 14, 1945 |
| 2,389,083 | Rosengren | Nov. 13, 1945 |